(12) United States Patent
Thompson

(10) Patent No.: US 11,004,349 B2
(45) Date of Patent: May 11, 2021

(54) LANDING ALERT SYSTEM

(71) Applicant: Rockwell Collins, Inc., Cedar Rapids, IA (US)

(72) Inventor: Bradley R. Thompson, Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 244 days.

(21) Appl. No.: 16/272,719

(22) Filed: Feb. 11, 2019

(65) Prior Publication Data

US 2020/0258404 A1 Aug. 13, 2020

(51) Int. Cl.
*G08G 5/02* (2006.01)
*G08G 5/00* (2006.01)
*G08G 5/04* (2006.01)

(52) U.S. Cl.
CPC .......... *G08G 5/025* (2013.01); *G08G 5/0043* (2013.01); *G08G 5/045* (2013.01)

(58) Field of Classification Search
CPC ...................................................... G08G 5/025
See application file for complete search history.

(56) References Cited

U.S. PATENT DOCUMENTS

| | | | | |
|---|---|---|---|---|
| 6,711,479 | B1 * | 3/2004 | Staggs ................. | G05D 1/0676 244/187 |
| 7,436,323 | B2 * | 10/2008 | Ishihara ................. | G01C 23/00 340/951 |
| 8,630,756 | B2 * | 1/2014 | Fleiger-Holmes ..... | B64D 45/04 701/16 |
| 9,082,301 | B2 * | 7/2015 | Catalfamo ............. | G08G 5/025 |
| 9,098,999 | B2 * | 8/2015 | Snow ...................... | G08G 5/025 |
| 9,189,964 | B1 * | 11/2015 | Rathinam ............. | G01S 13/913 |
| 9,663,223 | B1 * | 5/2017 | Harrison ............... | B64C 25/426 |
| 10,029,804 | B1 * | 7/2018 | Chamberlain .......... | G06T 7/194 |

(Continued)

FOREIGN PATENT DOCUMENTS

| EP | 3 382 672 A1 | 10/2018 |
|---|---|---|
| WO | WO-01/57827 A1 | 8/2001 |

OTHER PUBLICATIONS

Extended European Search Report for EP Application No. 19210639. 1, dated Feb. 26, 2020, 7 pages.

*Primary Examiner* — Alex C Dunn
(74) *Attorney, Agent, or Firm* — Suiter Swantz pc llo

(57) ABSTRACT

The present disclosure relates to a go-around system for an aircraft. The go-around system includes a controller, an alert system, an auto flight system, and an auto throttle system. The controller is configured to receive flight path information, airspeed information, and runway information from one or more avionic systems, determine, based on the flight path information, airspeed information, and runway information, a go-around advisory, and output an alert signal regarding the go-around advisory. The go-around advisory is a directive to perform a go-around. The alert system is configured to provide at least one of a visual alert, an aural alert, and a detailed information alert to a user in response to receiving the alert signal from the controller. The auto throttle system is configured to automatically adjust a speed of the aircraft for a go-around based on the go-around advisory.

21 Claims, 12 Drawing Sheets

(56) References Cited

U.S. PATENT DOCUMENTS

| | | | | |
|---|---|---|---|---|
| 2004/0044446 A1* | 3/2004 | Staggs | ............... | G08G 5/025 701/16 |
| 2005/0151681 A1* | 7/2005 | Conner | ............... | G08G 5/065 342/36 |
| 2016/0335901 A1* | 11/2016 | Singh | ............... | G08G 5/0021 |

* cited by examiner

LANDING ALERT SYSTEM

BACKGROUND

The present disclosure relates generally to the field of avionics. More specifically, the present disclosure relates generally to the field of avionic advisory systems for determining when a go-around should be performed by a pilot.

Go-arounds or aborted landings are performed when it is determined that an aircraft approaching a runway for a landing cannot properly land. Typically, when to implement a go-around or an aborted landing is determined based on pilot judgment. When a pilot begins landing an aircraft, the pilot must remain mindful of a variety of factors including but not limited to approach speed, runway obstructions, altitude, descent rate, etc., which may require a go-around or aborted landing. On some occasions, pilots should perform a go-around or abort the landing but do not, since the pilots may believe that performing a go-around or aborting a landing is admittance of poor performance on their part. Additionally, the pilots may believe that if they decide to perform a go-around or abort the landing, this may disrupt Air Traffic Control (ATC) of the airport and cause traffic congestion. Furthermore, the pilot may be inexperienced in performing go-arounds or aborted landings, and may choose to continue landing the aircraft even when a go-around/aborted landing should be performed due to lack of experience. Due to these factors, pilots sometimes choose to continue with the landing instead of performing a go-around/abort the landing, even when a go-around should be performed.

There is a need for an autonomous alert system to determine when the pilot should perform a go-around/abort a landing and notify the pilot when to perform the go-around maneuver. Further, there is a need for a system which identifies when a go-around should be performed and automatically initiates a go-around sequence to improve landing safety.

SUMMARY

In one aspect, the inventive concepts disclosed herein are directed to a go-around system for an aircraft. In some embodiments, the go-around system includes a controller, an alert system, and an auto throttle system. In some embodiments, the controller is configured to receive flight path information, airspeed information, and runway information from one or more avionics systems, determine, based on the flight path information, airspeed information, and runway information, a go-around advisory, and output an alert signal regarding the go-around advisory. In some embodiments, the go-around advisory is a directive to perform a go-around. In some embodiments, the alert system is configured to provide at least one of a visual alert, an aural alert, and a detailed information alert to a user in response to receiving the alert signal from the controller. In some embodiments, the auto throttle system is configured to automatically adjust a speed of the aircraft for a go-around based on the go-around advisory. In some embodiments, the go-around system includes a flight guidance system configured to automatically perform lateral and vertical go-around modes based on the go-advisory. In some embodiments, the go-around system includes an auto pilot system configured to perform a go-around maneuver based on the go-around advisory. In some embodiments, the go-around system includes an auto flight system.

In a further aspect, embodiments of the inventive concepts disclosed herein are directed to a controller for determining a go-around advisory of an aircraft and providing a go-around advisory alert. In some embodiments, the controller is configured to monitor flight path information, airspeed information, and runway information. In some embodiments, the flight path information includes a flight path variable, the airspeed information includes an airspeed variable, and the runway information includes a runway variable. In some embodiments, the controller is configured to determine a flight path difference between a predetermined flight path threshold value and the flight path variable, an airspeed difference between a predetermined airspeed threshold value and the airspeed variable, and a runway difference between a predetermined runway threshold value and the runway variable, determine a go-around advisory based on at least one of the flight path difference, the airspeed difference, and the runway difference, and provide an alert regarding the go-around advisory. In some embodiments, the alert includes at least one of a visual alert, an aural alert, and a detailed information alert.

In still further aspect, embodiments of the inventive concepts disclosed herein are directed to a method for determining if a landing of an aircraft should be aborted, according to some embodiments. In some embodiments, the method includes receiving at least one of flight path information, airspeed information, and runway information from one or more avionic systems, comparing one or more of the flight path information, the airspeed information, and the runway information to an associated reference value, determining a go-around advisory based on one of the flight path information, the airspeed information, and the runway information exceeding the associated reference value by a predetermined amount, and outputting an alert regarding the go-around advisory. In some embodiments, the alert includes at least one of a visual alert, an auditory alert, and a detailed information alert.

BRIEF DESCRIPTION OF THE DRAWINGS

Implementations of the inventive concepts disclosed herein may be better understood when consideration is given to the following detailed description thereof. Such description makes reference to the included drawings, which are not necessarily to scale, and in which some features may be exaggerated and some features may be omitted or may be represented schematically in the interest of clarity. Like reference numerals in the drawings may represent and refer to the same or similar element, feature, or function. In the drawings.

DETAILED DESCRIPTION

Figure 1:
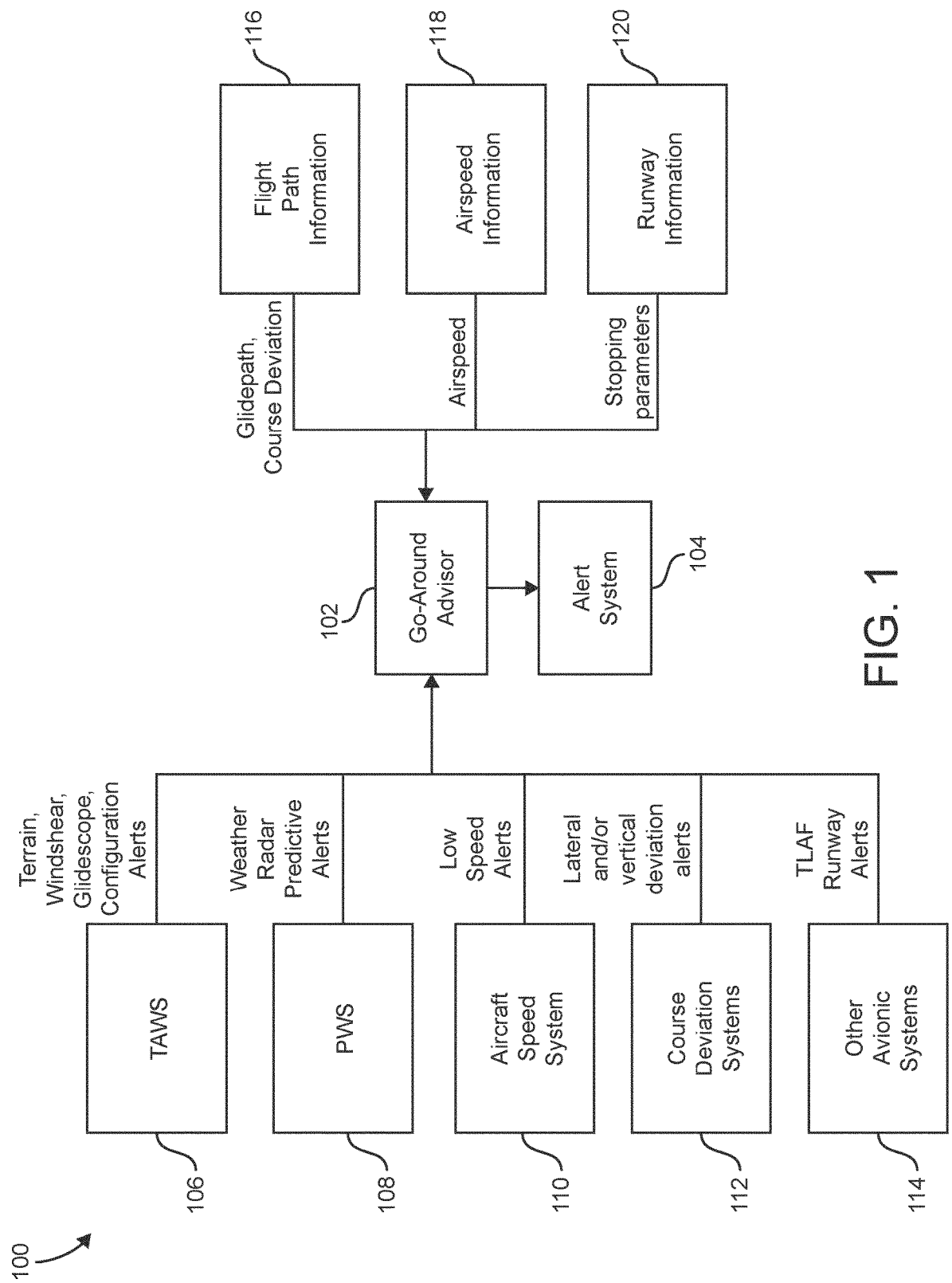
FIG. 1 is a block diagram of a go-around alert system, according to some embodiments.

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

Overview

Referring now to FIG. 1, a diagram of a go-around alert system 100 for an aircraft is shown, according to some embodiments. Go-around alert system 100 includes go-around advisor 102, according to some embodiments. In some embodiments, go-around advisor 102 collects (e.g., receives, monitors, requests, etc.) information from various avionic systems on the aircraft and, based on the received information, determines if a pilot operating the aircraft should perform a go-around. In some embodiments, if go-around advisor 102 determines that a go-around should be performed, the go-around advisor provides a command to alert system 104, and alert system 104 notifies the pilot that the landing should be aborted either with a visual alert, an aural alert, or a combination of both. The operation of go-around advisor 102 and alert system 104 are described in greater detail throughout the present disclosure.

Go-around advisor 102 receives information from a Terrain Avoidance and Warning System (TAWS) 106, a Predictive Windshear System (PWS) 108, an aircraft speed system 110, course deviation systems 112 (e.g., Localizer Performance with Vertical Guidance (LPV), required navigation performance (RNP), instrument landing system (ILS), Global Positioning Systems (GPS), etc.), Synthetic Vision Systems (SVS), and other avionic systems 114, according to some embodiments. In some embodiments, each of these avionic systems are alert systems, which provide go-around advisor 102 with alerts regarding operations of the aircraft.

In some embodiments, go-around advisor 102 receives alerts from any of or a combination of the avionic alert or monitoring systems 106-114 shown in FIG. 1. Go-around advisor 102 also uses other information regarding the operation and approach of the aircraft to determine if the pilot should perform a go-around, according to some embodiments. In some embodiments, go-around advisor 102 receives flight path information 116, airspeed information 118, and runway information 120. In some embodiments, go-around advisor 102 receives any of flight path information 116, airspeed information 118, and runway information 120 from any of the alert systems 106-114, a Heads Up Display (HUD), various avionic instrumentation, various avionic systems, etc. For example, go-around advisor 102 receives flight path information 116 from one or more course deviation systems 112 such as an LPV system, a Lateral Navigation (LNAV) system, an area navigation (RNAV) system, an ILS, etc., according to some embodiments.

Go-around advisor 102 uses the various collected information to accurately determine and advise the pilot of the aircraft when to perform a go-around, according to some embodiments. Advantageously, this facilitates a non-biased determination of when to abort a landing/perform a go-around as compared to a human decision, according to some embodiments. In some embodiments, go-around advisor 102 automatically activates a Takeoff/Go-Around (TOGA) switch in response to a determination that a go-around should be performed. In some embodiments, go-around advisor 102 notifies the pilot that the TOGA switch should be activated in response to a determination that a go-around should be performed. In some embodiments, go-around advisor 102 is communicably connected to ATC and receives a notification to perform a go-around. In some embodiments, go-around advisor 102 is configured to automatically initiate a go-around sequence in response to the notification received from ATC.

Figure 2:
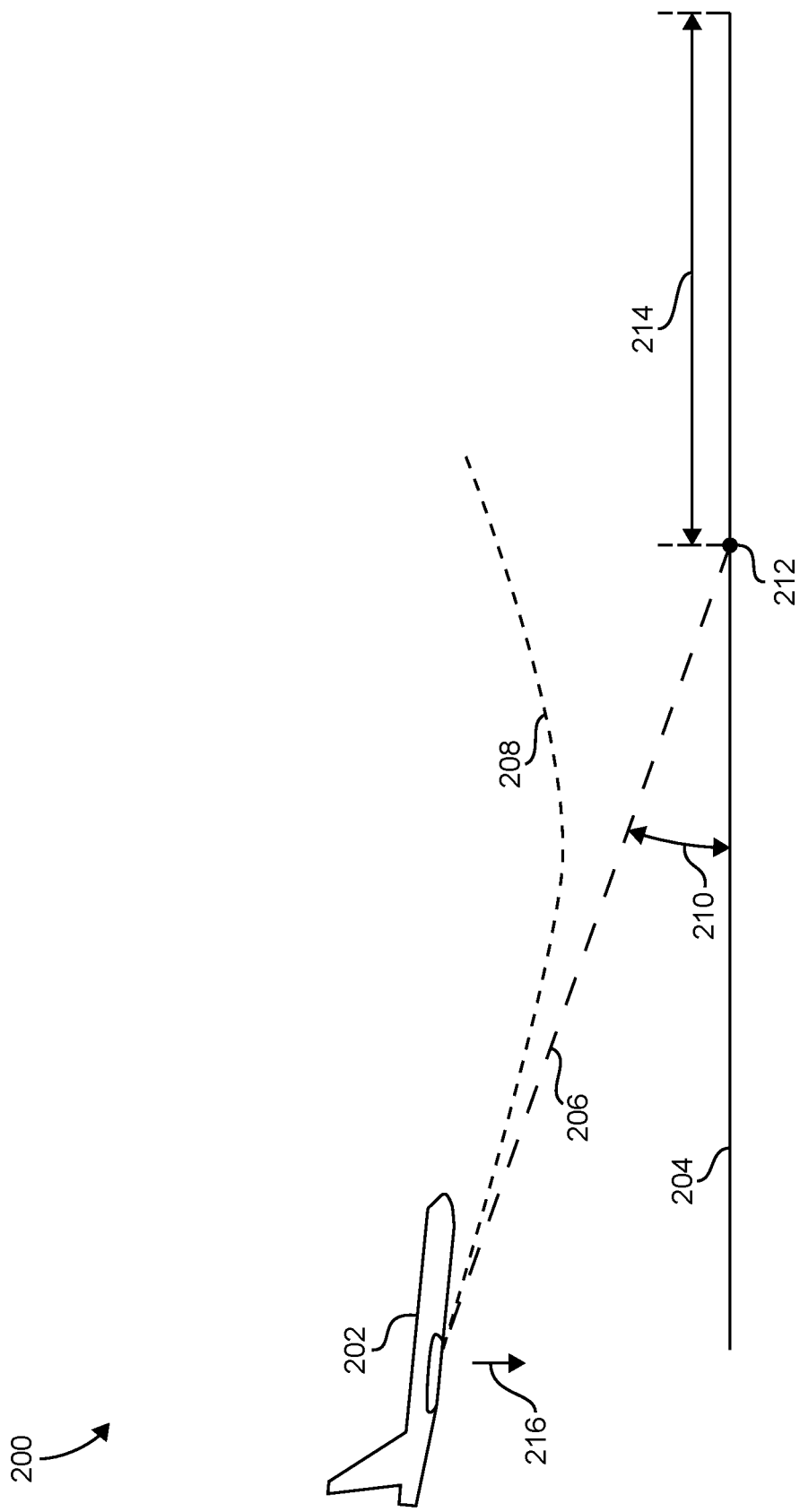
FIG. 2 is a diagram illustrating a go-around maneuver of an aircraft, according to some embodiments.

Referring now to FIG. 2, a diagram 200 of an aircraft 202 approaching runway 204 is shown, according to some embodiments. In some embodiments, as aircraft 202 approaches runway 204 for landing, it follows glidepath 206. In some embodiments, aircraft 202 approaches runway 204 along glidepath 206 at angle 210. In some embodiments, angle 210 is an approach angle, determined based on aircraft and runway characteristics. In some embodiments, if it is determined that aircraft 202 cannot achieve the landing (e.g., as determined by go-around advisor 102), aircraft 202 performs a go-around. In some embodiments, when aircraft 202 performs the go-around, aircraft 202 follows go-around path 208. As shown in FIG. 2, as aircraft 202 follows go-around path 208, the landing is aborted and aircraft 202 may circle the airport and approach for a second landing attempt, according to some embodiments. In some embodiments, go-around advisor 102 can use determined touchdown point 212 and estimated stopping distance 214 to determine if a go-around should be performed, described in greater detail below. Go-around advisor 102 aids pilots in both single and dual crew operations by reducing crew workload and improving identification of when to perform a go-around maneuver, according to some embodiments.

Terrain Awareness and Warning (TAW) System

Referring again to FIG. 1, go-around advisor 102 receives alerts and/or information from TAWS 106, according to some embodiments. In some embodiments, go-around advisor 102 receives alerts and/or information from a Ground Proximity Warning System (GPWS) and/or an Enhanced Ground Proximity Warning System (EGPWS). TAWS 106, GPWS, and/or EGPWS provide the pilot and go-around advisor 102 with alerts and/or information regarding terrain awareness and warnings regarding potentially hazardous terrain situations approaching, according to some embodiments. In some embodiments, TAWS 106, GPWS, and/or EGPWS provide go-around advisor 102 with alerts and/or information regarding a proximity of potentially hazardous terrain. TAWS 106 is a class A system, providing go-around advisor 102 with alerts regarding excessive rates of descent, terrain approach rate, excessive deviations from an ILS glideslope, reactive windshear conditions, etc., according to some embodiments. In some embodiments, TAWS 106 provides go-around advisor 102 with alerts regarding the approach of terrain. Using TAWS 106 solely as a predictor of when to perform a go-around as used in some go-around advisors results in inaccurate and annoying go-around advisories, which pilots often ignore, according to some embodiments. For example, TAWS 106 does not necessarily take into account the terrain surrounding the airport and the runway, and may provide incorrect advisories to perform a go-around, according to some embodiments. In some embodiments, if TAWS 106 is the sole system used to determine if a go-around should be performed, pilots will ignore TAWS 106 alerts, since the pilots may visually identify a clear approach path. For example, if TAWS 106 is the sole system used to determine if a go-around should be performed, at airports with mountainous terrain surroundings, TAWS 106 may be unsatisfactory for identifying if a go-around should be performed.

In some embodiments, TAWS 106 is not used as the sole system for determining if a go-around should be performed, but go-around advisor 102 uses any of the alerts and information provided by TAWS 106 and upon further analysis, determines if a go-around should be performed.

Terrain Caution

Referring still to FIG. 1, in some embodiments, TAWS 106 provides go-around advisor 102 with alerts and/or information regarding terrain caution. For example, TAWS 106 may provide go-around advisor 102 with any of a terrain closure rate, terrain proximity, etc., or any other information or alerts relevant to terrain approach and terrain position relative to the aircraft. In some embodiments, go-around advisor 102 uses the information and/or alerts from TAWS 106 to determine if the pilot should perform a go-around.

Reactive Windshear

Referring still to FIG. 1, in some embodiments, go-around advisor 102 receives information regarding reactive windshear from TAWS 106. For example, TAWS 106 provides go-around advisor with information regarding horizontal and/or vertical reactive windshear relevant to the landing of the aircraft, according to some embodiments. TAWS 106 senses windshear which the aircraft is presently experiencing and provides the alert to go-around advisor 102, according to some embodiments. In some embodiments, the information includes direction and velocity of windshear that the aircraft is experiencing. In some embodiments, go-around advisor 102 receives windshear information from a reactive windshear system, or any other avionic system configured to monitor/measure reactive windshear. In some embodiments, a Flight Augmentation Computer (FAC) facilitates the determination of reactive windshear. In some embodiments, the windshear is determined based on air speed, ground speed, vertical speed, slope, wind gradient, vertical wind, etc., and is provided to go-around advisor 102.

Glideslope

Referring still to FIG. 1, in some embodiments go-around advisor 102 receives information and/or alerts from TAWS 106 regarding aircraft glideslope(s). For example, go-around advisor 102 receives information and/or alerts from TAWS 106 regarding descent rate, altitude loss after a take-off or go-around, terrain rise rate relative to rise rate of the aircraft, descent rate below ILS glideslope, radio height, bank angle, etc., according to some embodiments. In some embodiments, go-around advisor 102 receives glideslope information from systems other than TAWS 106. For example, go-around advisor 102 receives glideslope information from an ILS glideslope, according to some embodiments. In some embodiments, go-around advisor 102 receives glideslope information from any avionic system configured to monitor/determine glideslope information. In some embodiments, go-around advisor 102 receives information from a localizer.

Configuration

Referring still to FIG. 1, in some embodiments, go-around advisor 102 receives information from TAWS 106 regarding configuration alerts. For example, go-around advisor 102 receives information and/or alerts from TAWS 106 indicating terrain proximity or closure relative to flap configuration (e.g., landing flap not selected), and/or landing gear (e.g., landing gear not locked down), according to some embodiments. Go-around advisor 102 receives information from any avionic system regarding the configuration of aircraft equipment (e.g., flaps, rudder, landing gear, etc.), according to some embodiments.

Weather Radar Predictive Windshear System

Referring still to FIG. 1, go-around advisor 102 is shown receiving information from PWS 108, according to some embodiments. In some embodiments, PWS 108 is an avionic system configured to predict windshear based on weather radar data (e.g., WXR-2100 MultiScan ThreatTrack™ weather radar produced by Collins Aerospace (Rockwell Collins, Inc.)). In some embodiments, PWS 108 provides go-around advisor 102 with predicted windshear information and/or alerts. The information received from PWS 108 may be any of predicted turbulence, storms, direction and velocity of windshear, air speed, wind gradient, vertical wind, etc., which the aircraft may encounter, according to some embodiments.

Speed System

Referring still to FIG. 1, go-around advisor 102 is shown receiving speed information and/or alerts from aircraft speed system 110, according to some embodiments. In some embodiments, go-around advisor 102 receives information regarding windspeed (e.g., speed of the aircraft relative to the air), calibrated airspeed, equivalent airspeed, true airspeed, speed of the aircraft relative to the ground, speed of the aircraft relative to the runway, etc. In some embodiments, go-around advisor 102 receives the speed information from the HUD. In some embodiments, go-around advisor 102 receives the speed information and/or alerts from an airspeed system which includes one or more pitot static tubes and controllers configured to determine any of an airspeed, a speed of the aircraft relative to the ground, etc. In some embodiments, go-around advisor 102 receives low speed (e.g., minimum maneuvering speed, stall warning speed, etc.) alerts from aircraft speed system 110. In some embodiments, aircraft speed system 110 is any avionic system configured to measure/determine airspeed and/or aircraft speed relative to the ground.

Excessive Lateral and/or Vertical Deviations from Approach Course

Referring still to FIG. 1, go-around advisor 102 is shown receiving lateral and/or vertical deviation alerts and/or information from one or more course deviation systems 112, according to some embodiments. In some embodiments, course deviation systems 112 are any avionic system configured to monitor course deviation of the aircraft. In some embodiments, go-around advisor 102 receives information and/or alerts from course deviation systems 112 regarding excessive lateral and/or vertical deviations from an approach course/path. In some embodiments, course deviation system 112 is any of an LPV system, a RNP system, a ILS system, etc.

In some embodiments, course deviation system 112 is a LPV system. LPV systems use GPS satellites and Wide Area Augmentation Systems (WAAS), according to some embodiments. In some embodiments, course deviation system 112 is any of a LNAV system, a Vertical Navigation (VNAV) system, etc., or any other course deviation/guidance system which monitors/determines lateral and/or vertical deviations from the approach path. In some embodiments, course deviation system 112 is an ILS system.

Other Avionic Systems

Referring still to FIG. 1, go-around advisor 102 is shown receiving runway alerts from other avionic systems 114, according to some embodiments. In some embodiments, other avionic systems 114 is or includes one or more avionic systems configured to determine runway (e.g., take-off and landing) alerts. In some embodiments, other avionic systems 114 is or includes a Synthetic Vision System (SVS) produced by Collins Aerospace (Rockwell Collins, Inc.), a Takeoff and Landing Awareness Function (TLAF), an Enhanced Vision System (EVS), a Collins Aerospace Head-up Guidance System (HGS™). In some embodiments, any of the SVS, EVS, HGS, and TLAF determine runway alerts (e.g., runway too short, not a runway, wrong runway, etc.), and provides the alerts and/or information to go-around advisor 102. In some embodiments, any combination of alerts from SVS, EVS, HGS, and TLAF are provided to go-around advisor 102.

Flight Path Information

Referring still to FIG. 1, go-around advisor 102 is shown receiving flight path information 116, according to some embodiments. In some embodiments, flight path information 116 is any of a glidepath, course deviation, flight path angle, and descent rate. In some embodiments, flight path information 116 is received from any of an LNAV system, an LPV system, a Flight Management System (FMS), a Required Navigation Performance (RNP) system, an inertial reference system, an air data system, etc.

Glidepath

Figure 3:
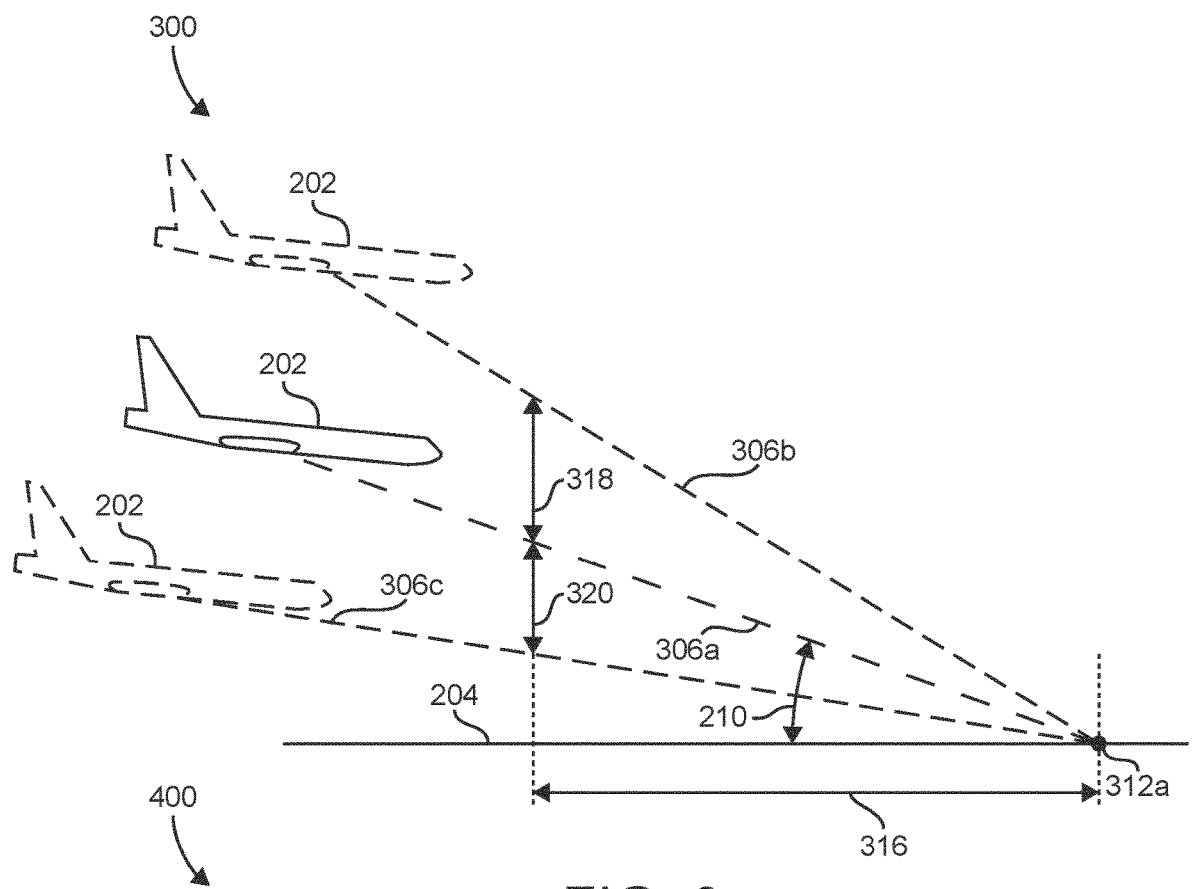
FIG. 3 is a diagram illustrating an aircraft approaching a runway for landing along multiple glidepaths having a common touch down point, according to some embodiments.
Figure 4:
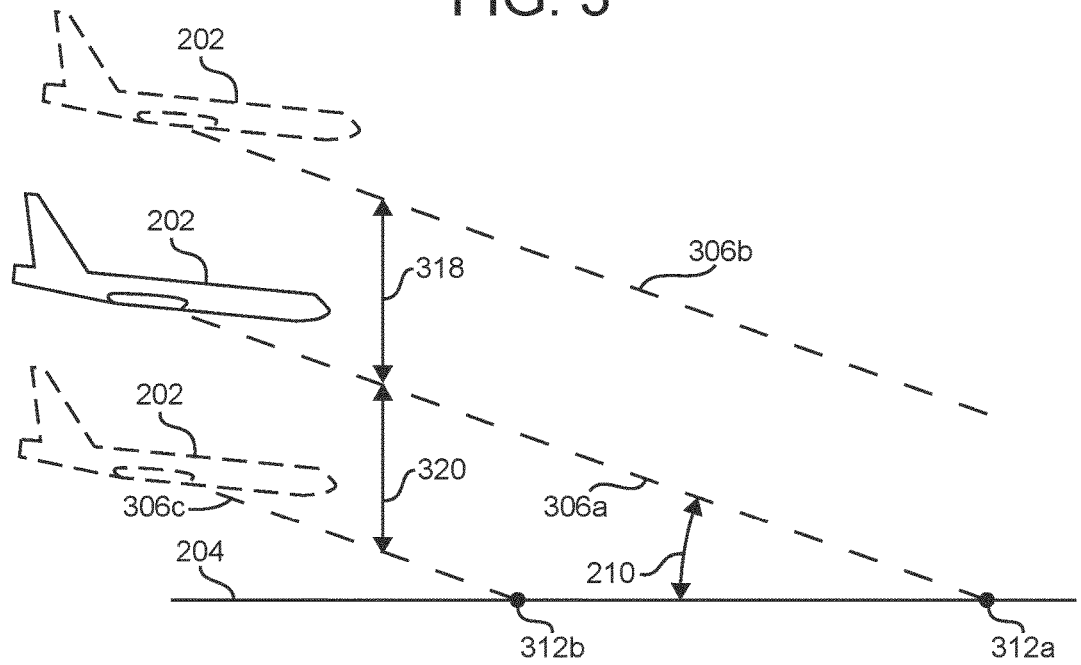
FIG. 4 is a diagram illustrating an aircraft approaching a runway for landing along multiple glidepaths having different touch down points, according to some embodiments.

Referring now to FIGS. 3-4, diagrams 300 and 400 of various approach possibilities of aircraft 202 are shown, according to some embodiments. FIG. 3 shows aircraft 202 approaching runway 204 for a landing along various glidepaths, according to some embodiments. FIG. 3 shows aircraft 202 approaching for a landing along glidepath 306a, according to some embodiments. In some embodiments, glidepath 306a is an optimal glidepath, which provides maximum stopping distance after aircraft 202 touches down at touchdown point 312a, and has a suitable glidepath angle 210. However, in some embodiments, aircraft 202 approaches runway 204 for a landing above or below glidepath 306a. Glidepath 306b shows aircraft 202 approaching runway above glidepath 306a, with a predicted touchdown point 312a, according to some embodiments. In some embodiments, go-around advisor 102 receives a vertical deviation 318 between glidepath 306a and glidepath 306b. In some embodiments, vertical deviation 318 is a distance that glidepath 306b is above glidepath 306a. In some embodiments, vertical deviation 318 is determined at a distance 316 from touchdown point 312a. In some embodiments, distance 316 is a distance between touchdown point 312a (or a predicted touchdown point of the glidepath which aircraft 202 is currently following) and a present location of aircraft 202. For example, if aircraft 202 maintains glidepath 306b and the pilot does not correct the approach of aircraft 202, vertical deviation 318 decreases as aircraft 202 approaches touchdown point 312a.

Similarly, aircraft 202 may approach runway 204 for a landing below glidepath 306a, according to some embodiments. In some embodiments, aircraft 202 approaches runway 204 for a landing along glide path 306c. Glidepath 306c shows aircraft 202 approaching runway 204 for a landing below glidepath 306a, according to some embodiments. In some embodiments, go-around advisor 102 receives vertical deviation 320 between glidepath 306a and glidepath 306c. In some embodiments, vertical deviation 320 is a distance that glidepath 306c is below glidepath 306a. In some embodiments, vertical deviation 320 is calculated similarly to vertical deviation 318. In some embodiments, glidepath angles are calculated for each of glidepaths 306c and 306b (e.g., a glidepath angle calculated based on a current glidepath of aircraft 202) similarly to glidepath angle 210.

Referring now to FIG. 4, in some embodiments, aircraft 202 approaches runway 204 for a landing along a glidepath which does not have a same touchdown point 312a as glidepath 306a. For example, aircraft 202 approaches runway 204 along glidepath 306b or glidepath 306c, according to some embodiments. In some embodiments, vertical deviations 318 and 320 are determined by or provided to go-around advisor 102. In some embodiments, go-around advisor 102 uses the determined vertical deviations 318 and 320 to determine if the pilot should perform a go-around or abort the landing. In some embodiments, vertical deviation 318 is referred to as variable $\Delta_{+,GP}$. In some embodiments, vertical deviation 318, $\Delta_{+,GP}$, is an absolute difference between an optimal glidepath and a current glidepath at a current location, where the current glidepath is above the optimal glidepath. Likewise, vertical deviation 320 is referred to as variable $\Delta_{-,GP}$, according to some embodiments. In some embodiments, vertical deviation 320, $\Delta_{-,GP}$, is an absolute difference between an optimal glidepath and a current glidepath at a current location, where the current glidepath is below the optimal glidepath.

Final Approach Course

Figure 5:
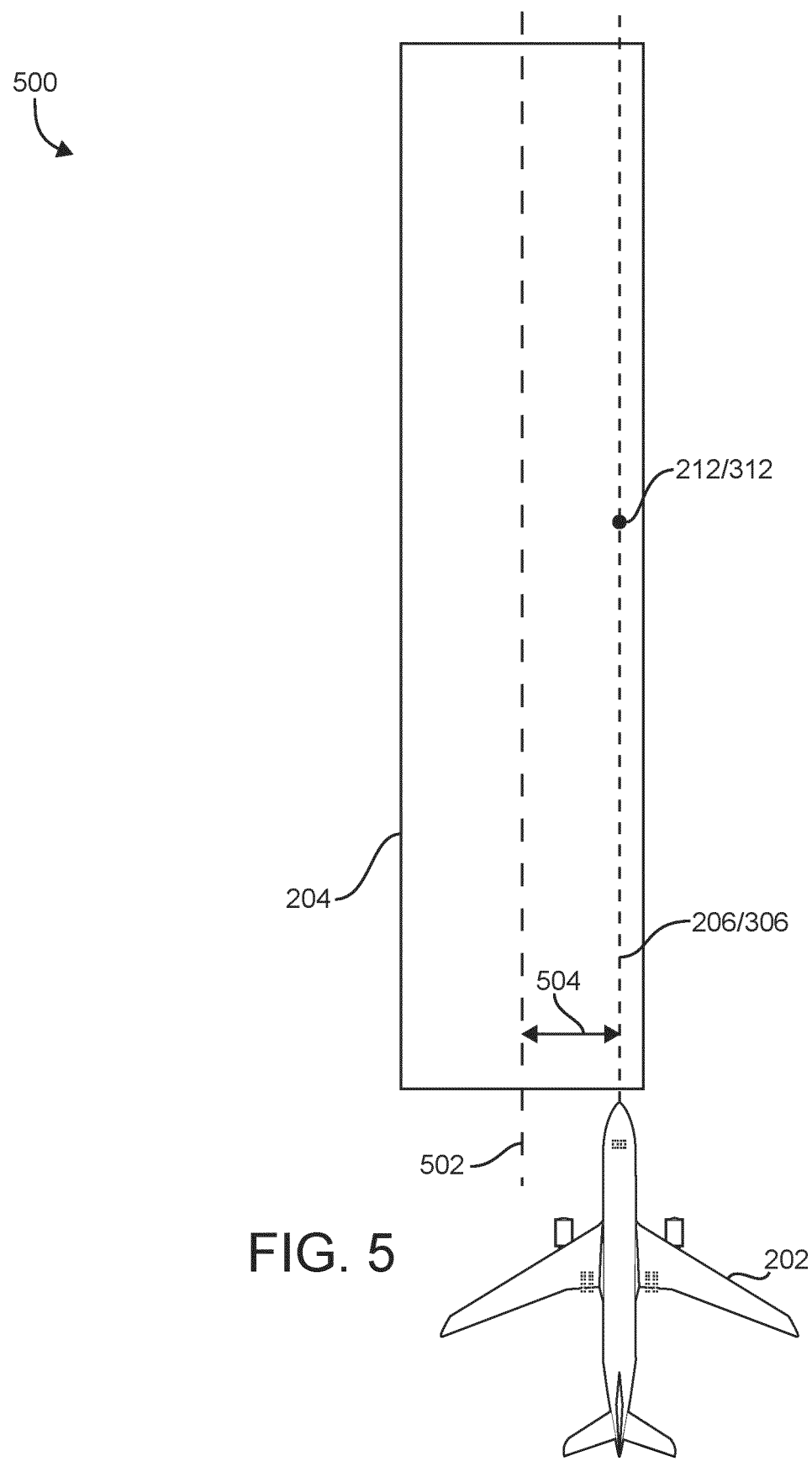
FIG. 5 is a diagram illustrating an aircraft approaching a runway for landing having a lateral offset relative to a centerline of the runway, according to some embodiments.

Referring now to FIG. 5, a diagram 500 illustrating a final approach course 502 from a view above runway 204 is shown, according to some embodiments. In some embodiments, aircraft 202 approaches runway 204 for a landing offset a distance left or right from final approach course 502. In some embodiments, final approach course 502 is a centerline of runway 204. In some embodiments, aircraft 202 approaches runway 204 along glidepath 206/306. In some embodiments, from a top view, aircraft 202 approaches runway 204 along glide path 206/306 which is offset distance 504 from final approach course 502. Distance 504 is a normal distance between a current position of aircraft 202 and final approach course 502, according to some embodiments. In some embodiments, if glidepath 206/306 is not parallel final approach course 502, distance 504 is only normal to final approach course 502. In some embodiments, as shown in FIG. 5, aircraft 202 approaches runway 204 to the right of final approach course 502. In some embodiments, aircraft 202 approaches runway 204 to the left of final approach course 502. In some embodiments, distance 504 is represented by the variable $\Delta_{FAC}$. In some embodiments, distance 504, $\Delta_{FAC}$, is an absolute value. In some embodiments, distance 504, $\Delta_{FAC}$, is a magnitude of an offset of aircraft 202 from final approach course 502. In some embodiments, go-around advisor 102 uses distance 504, $\Delta_{FAC}$, to determine if the pilot should perform a go-around or abort the landing.

Descent Rate

Referring again to FIG. 2, in some embodiments, go-around advisor 102 receives information regarding a current descent rate 216 of aircraft 202. In some embodiments, descent rate 216 is a velocity at which aircraft 202 is descending (e.g., a rate of decreasing altitude). In some embodiments, descent rate 216 has units of feet per minute (fpm). In some embodiments, descent rate 216 indicates a distance aircraft 202 must travel along its current trajectory to descend (e.g., decrease altitude) a certain amount. In some embodiments, descent rate 216 is represented by variable $v_{DR}$. In some embodiments, go-around advisor 102 calculates or receives a difference between descent rate 216 and a reference descent rate value. In some embodiments, the difference between descent rate 216 and the reference descent rate value is determined by the following equation: $\Delta_{DR} = v_{DR} - v_{DR,ref}$, where $\Delta_{DR}$ is a difference in descent rate, $v_{DR}$ is descent rate 216, and $v_{DR,ref}$ is a reference descent rate. In some embodiments, go-around advisor 102 uses descent rate 216 and/or the descent rate difference to determine if the pilot should perform a go-around maneuver or abort the landing.

Airspeed Information

Referring again to FIG. 1, go-around advisor 102 is shown receiving airspeed information 118, according to some embodiments. In some embodiments, airspeed information 118 includes information regarding true, calculated, estimated, calibrated, etc., airspeed. In some embodiments, go-around advisor 102 uses airspeed information 118 to determine if the pilot should perform a go-around maneuver or abort a landing.

Reference Velocity and Gust Factor

In some embodiments, go-around advisor 102 determines and/or receives a difference between airspeed and a reference approach speed value. In some embodiments, an amount the airspeed exceeds the reference airspeed is defined as variable $\Delta_{a,+}$. In some embodiments, the amount the airspeed exceeds the reference airspeed value, $\Delta_{a,+}$, is determined using the equation:

$$\Delta_{a,+} = v_a - v_{ref} | \Delta_{a,+} \geq 0$$

In some embodiments, an amount which the airspeed is below the reference airspeed value is defined by the following equation:

$$\Delta_{a,-} = v_a - v_{ref} | \Delta_{a,-} < 0$$

In some embodiments, a gust factor (GF) is taken into account for $\Delta_{a,+}$. In some embodiments, $\Delta_{a,+}$ is determined using the following equation, taking into account the GF:

$$\Delta_{a,+} = v_a - (v_{ref} + GF) | \Delta_{a,+} \geq 0$$

In some embodiments, go-around advisor 102 uses $\Delta_{a,+}$ and/or $\Delta_{a,-}$ to determine if the pilot should perform a go-around maneuver or if the landing should be aborted. In some embodiments, go-around advisor 102 uses the airspeed, $v_a$, the reference approach speed, $v_{ref}$, and the gust factor directly to determine if the pilot should abort the landing.

Runway Information

Referring still to FIG. 1, go-around advisor 102 is shown receiving runway information 120, according to some embodiments. In some embodiments, runway information 120 includes stopping parameters. In some embodiments, runway information 120 includes a touchdown location of a current trajectory of the aircraft, an aircraft speed, and a stopping distance. In some embodiments, runway information 120 includes information from which touchdown location, aircraft speed, and/or stopping distance may be calculated (e.g., by go-around advisor 102). In some embodiments, any of the other avionic systems (e.g., systems 106-114 or any other avionic systems present on the aircraft) calculate stopping distance.

Touchdown Location, Aircraft Speed, and Stopping Distance

Figure 7:
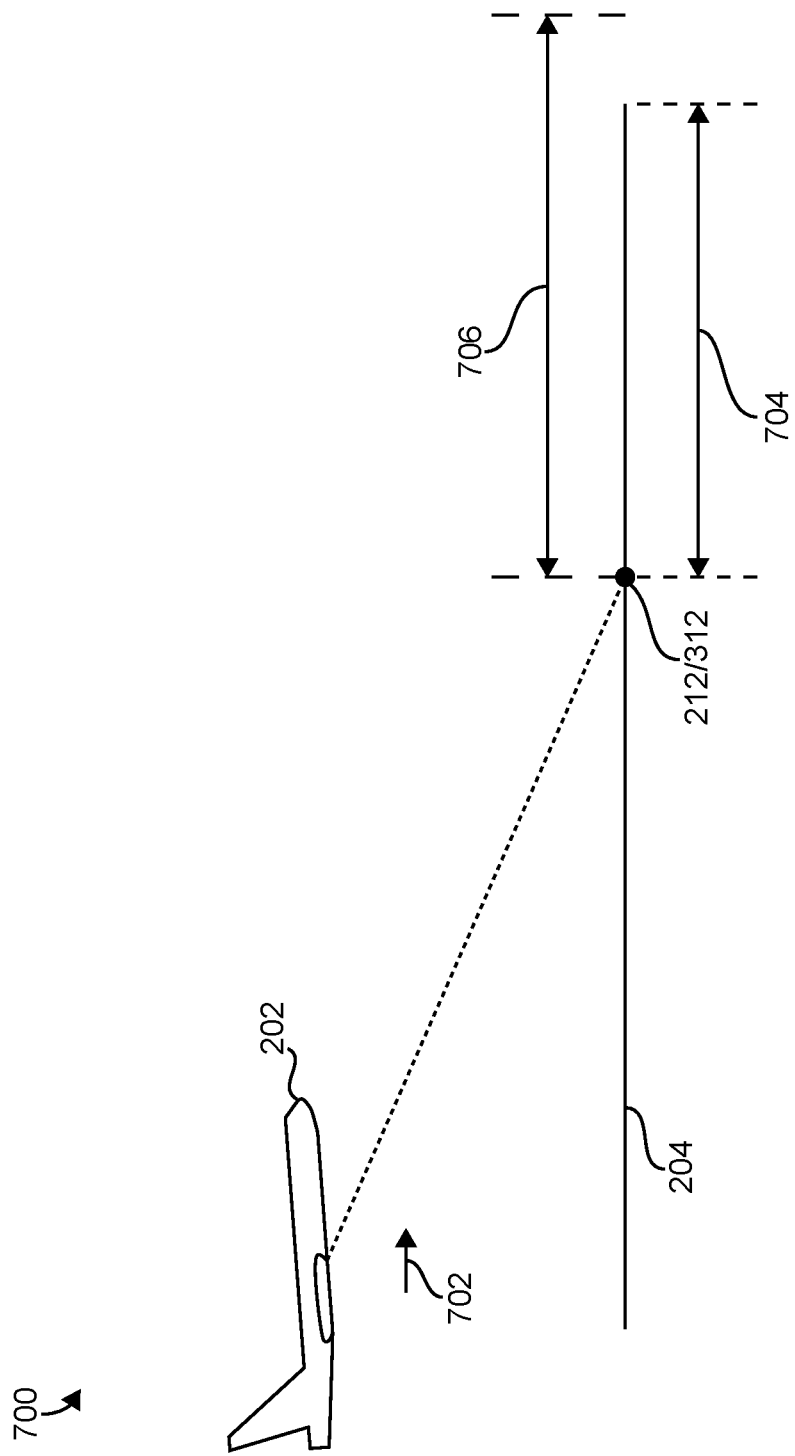
FIG. 7 is a diagram illustrating stopping distance of an aircraft approaching a runway for a landing, according to some embodiments.

Referring now to FIG. 7, in some embodiments, go-around advisor 102 determines if a go-around maneuver should be performed based on a required stopping distance for aircraft 202 and an estimated stopping distance. In some embodiments, a required stopping distance for aircraft 202 is determined based on any of aircraft speed 702, mass of aircraft 202, occupancy of aircraft 202, braking abilities of aircraft 202, etc. For example, certain aircrafts require a larger (i.e., longer) stopping distance, according to some embodiments. In some embodiments, a function is used to determine a required stopping distance of aircraft 202:

$$d_{stopping} = f(m_{aircraft}, v_{aircraft}, \text{parameters}_{aircraft}, \text{parameters}_{airport/runway})$$

where $d_{stopping}$ is a required distance which aircraft 202 needs to come to a complete stop, $m_{aircraft}$ is mass of aircraft 202 (e.g., including passengers, assuming full capacity, etc.), $v_{aircraft}$ is aircraft speed 702 (e.g., a magnitude of aircraft speed 702, a portion of aircraft speed parallel to runway 204, etc.), parameters$_{aircraft}$ are various braking abilities of aircraft 202 (e.g., frictional coefficients, braking system parameters, etc.), and parameters$_{airport/runway}$ includes various parameters of a runway and/or an airport which aircraft 202 is approaching (e.g., wind, runway conditions (e.g., dry, wet, ice, snow, etc.), braking action, temperature, density altitude, etc.). In some embodiments, parameters$_{airport/runway}$ is provided to go-around advisor 102 and/or to aircraft 202 via a datalink (e.g., Digital ATIS) and used by on-board systems to determine $d_{stopping}$ (e.g., by go-around advisor 102 and/or any other avionic system).

Referring still to FIG. 7, diagram 700 is shown to include required stopping distance 706, according to some embodiments. In some embodiments, required stopping distance 706 is $d_{stopping}$. In some embodiments, required stopping distance 706 is a distance along runway 204 required to bring aircraft 202 to a complete stop or a negligible velocity after aircraft 202 has touched down on runway 204 at touchdown point 212. In some embodiments, a distance 704 of runway 204 is defined. Distance 704 represents a remaining amount of runway 204 available for stopping after touchdown point 212/213, according to some embodiments. In some embodiments, distance 704 is a maximum allowable braking distance for aircraft 202. For example, in some embodiments, a buffer is built into distance 704 and/or stopping distance 706 to ensure that aircraft 202 stops and does not approach too closely to surrounding buildings, other aircrafts, other runways, taxiways, etc. In some embodiments, a difference between distance 704 and stopping distance 706 is determined. If stopping distance 706 is greater than distance 704, go-around advisor 102 determines that the pilot should abort the landing or perform a go-around maneuver, since aircraft 202 cannot stop before an end of the runway, according to some embodiments.

Controller Overview

Figure 6:
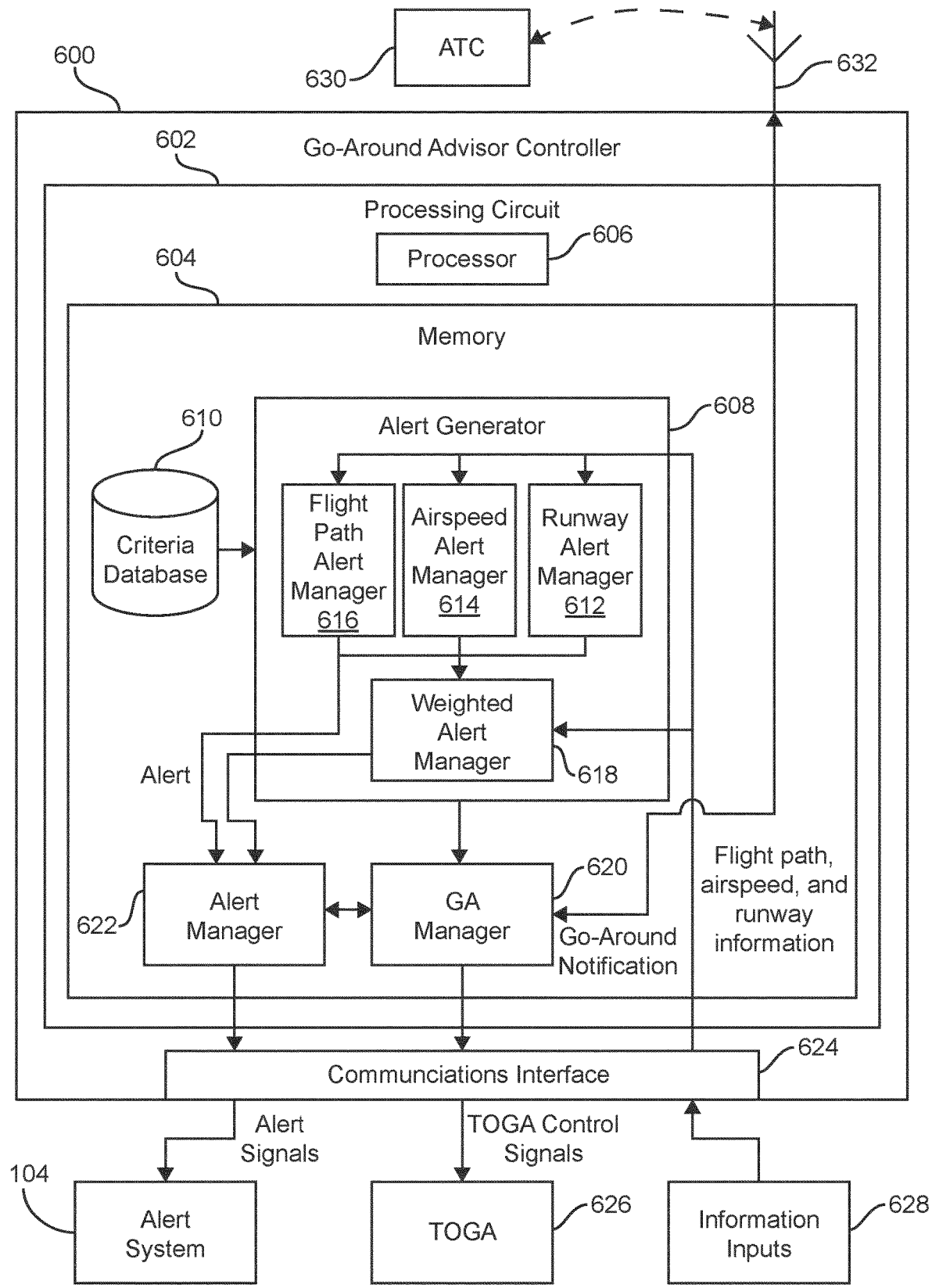
FIG. 6 is a block diagram of a go-around advisor controller, according to some embodiments.

Referring now to FIG. 6, a go-around advisor controller 600 is shown, according to some embodiments. In some embodiments, go-around advisor controller 600 is go-around advisor 102 as shown in FIG. 1. Go-around advisor controller 600 is configured to determine if a go-around maneuver should be performed (e.g., aborted landing), described in greater detail below, according to some embodiments. In some embodiments, go-around advisor controller 600 is configured to use, receive, or calculate any of the information and variables as described in greater detail above with reference to FIGS. 1-5 and 7. In some embodiments, go-around advisor controller 600 is integrated as a component of (e.g., a processing circuit of, a software application of) another avionic system. In some embodiments, go-around advisor controller 600 is communicably connected to or is a component of a data concentrator of a Pro Line Fusion® system, as produced by Collins Aerospace (Rockwell Collins, Inc.).

Go-around advisor controller 600 is shown to include a processing circuit 602 having a processor 606 and memory 604, according to some embodiments. Processor 606 is a general purpose or specific purpose processor, an application specific integrated circuit (ASIC), one or more field programmable gate arrays (FPGAs), a group of processing components, or other suitable processing components, according to some embodiments. In some embodiments, processor 606 is configured to execute computer code or instructions stored in memory 604 or received from other computer readable media (e.g., CDROM, network storage, a remote server, etc.).

Memory 604 includes one or more devices (e.g., memory units, memory devices, storage devices, etc.) for storing data and/or computer code for completing and/or facilitating the various processes described in the present disclosure, according to some embodiments. Memory 604 includes any of random access memory (RAM), read-only memory (ROM), hard drive storage, temporary storage, non-volatile memory, flash memory, optical memory, or any other suitable memory for storing software objects and/or computer instructions, according to some embodiments. In some embodiments, memory 604 includes any of database components, object code components, script components, or any other type of information structure for supporting the various activities and information structures described in the present disclosure. Memory 604 is communicably connected to processor 606 via processing circuit 602 and includes computer code for executing (e.g., by processor 606) one or more processes described herein, according to some embodiments. When processor 606 executes instructions stored in memory 604, processor 606 generally configures go-around advisor controller 600 (and more particularly processing circuit 602) to complete such activities, according to some embodiments.

Go-around advisor controller 600 is shown to include communications interface 624, according to some embodiments. Communications interface 624 is configured to facilitate communications between go-around advisor controller 600 and external applications (e.g., databases, avionic systems, devices, sensors, instruments, etc.), according to some embodiments.

Communications interface 624 is or includes wired or wireless communications interfaces (e.g., jacks, antennas, transmitters, receivers, transceivers, wire terminals, etc.) for conducting data communications with information inputs 628, various databases and networks, avionic systems, sensors, devices, etc., according to some embodiments. In some embodiments, communications via communications interface 624 is direct (e.g., local wired or wireless communications) or via a communications network (e.g., a WAN, the Internet, a cellular network, etc.). For example, in some embodiments, communications interface 624 is or includes an Ethernet card and port for sending and receiving data via an Ethernet-based communications link or network. In some embodiments, communications interface 624 includes a WiFi transceiver for communicating via a wireless communications network. In some embodiments, communications interface 624 is or includes cellular or mobile phone communications transceivers. In some embodiments, communications interface 624 is a Universal Serial Bus interface.

Referring still to FIG. 6, go-around advisor controller 600 is shown receiving information from information inputs 628, according to some embodiments. In some embodiments, information inputs 628 are any avionic systems, devices, instruments, sensors, etc., configured to provide go-around advisor controller 600 with inputs necessary to determine if the pilot should perform a go-around maneuver/abort the landing. In some embodiments, information inputs 628 are any of avionic systems 106-114 as shown in FIG. 1. In some embodiments, information inputs 628 provide go-around advisor controller 600 with any of flight path information 116, airspeed information 118, and runway information 120.

Go-around advisor controller 600 is configured to determine if a go-around maneuver should be performed, and output a command to alert system 104 to alert the pilot that the go-around maneuver should be performed, according to some embodiments. Alert system 104 may include any of a visual alert and/or an aural alert, as described in greater detail below with reference to the FIG. 10, according to some embodiments.

Referring still to FIG. 6, memory 605 is shown to include alert generator 608, criteria database 610, and alert manager 622, according to some embodiments. In some embodiments, go-around advisor controller 600 receives information from information inputs 628 through communications interface 624. In some embodiments, the information is provided to alert generator 608. Alert generator 608 is configured to analyze any of the information received from information inputs 628 to determine if a command should be send to alert system 104 to indicate a go-around maneuver. Alert generator 608 is shown to include a weighted alert manager 618, a flight path alert manager 616, an airspeed alert manager 614, and a runway alert manager 612, according to some embodiments. In some embodiments, alert generator 608 receives alert criteria for each of weighted alert manager 618, flight path alert manager 616, airspeed alert manager 614, and runway alert manager 612.

Flight Path Alert Manager

Each of flight path alert manager 616, airspeed alert manager 614, and runway alert manager 612 are configured to receive flight path, airspeed, and runway information from information inputs 628, according to some embodiments. In some embodiments, flight path alert manager 616 is configured to analyze flight path information provided by information inputs 628. In some embodiments, the flight path information provided to flight path alert manager 616 includes glidepath information, final approach course information, and descent rate information, as described in greater detail above with reference to the Flight Path Information section. In some embodiments, flight path alert manager 616 is configured to receive information regarding a current glidepath of the aircraft and a desired (e.g., optimal) glide path of the aircraft. In some embodiments, flight path alert manager 616 is configured to determine if the aircraft is below or above the desired glidepath. In some embodiments, if the aircraft is above or below the desired glidepath by a predetermined amount (e.g., a threshold), flight path alert manager 616 is configured to determine that the pilot should perform a go-around maneuver. In some embodiments, flight path alert manager 616 uses criteria provided by criteria database 610 and determines that the pilot should perform a go-around maneuver if the following criteria is met:

$$|\Delta_{+,GP}| > X_2$$

where $|\Delta_{+,GP}|$ is an absolute value of a vertical distance of the aircraft above the desired glidepath and $X_2$ is a threshold value provided by criteria database 610. Likewise, in some embodiments, flight path alert manager 616 determines that the pilot should perform a go-around maneuver if the following criteria is met:

$$|\Delta_{-,GP}| > X_1$$

where $|\Delta_{-,GP}|$ is an absolute value of a vertical distance of the aircraft below the desired glidepath and $X_1$ is a threshold value provided by criteria database 610. In some embodiments, $X_1$ and $X_2$ are equal values. In some embodiments, $X_1$ and $X_2$ are not equal. In this way, the criteria which flight path alert manager 616 uses to determine if a go-around maneuver may be tuned, such that flight path alert manager 616 is more sensitive to the aircraft being above the desired glidepath than below the desired glidepath and vice versa, according to some embodiments. In some embodiments, $X_1$ and $X_2$ are determined based on airport parameters, aircraft parameters, etc. For example, $X_1$ and $X_2$ are different for one aircraft than another aircraft, or for a different runway, airport, etc., according to some embodiments. In some embodiments, the criteria which flight path alert manager 616 uses to determine if the pilot should perform a go-around maneuver can be expressed with the following conditional statements:

If: $-X_1 < \Delta_{GP} < +X_2$    Then: No Alert

Else          Go Around Alert

In some embodiments, the flight path information received and analyzed by flight path alert manager includes lateral position and/or lateral displacement of the aircraft relative to a centerline of a runway which the aircraft is attempting to land on (see FIG. 5 and the accompanying description). In some embodiments, flight path alert manager 616 receives information regarding a lateral difference between a current position and a centerline of the runway. In some embodiments, flight path alert manager 616 receives $\Delta_{FAC}$, which indicates a lateral offset of the aircraft from the centerline of the runway (e.g., in feet, meters, etc., or any other distance units). In some embodiments, flight path alert manager 616 determines whether a go-around maneuver should be performed if $\Delta_{FAC}$ exceeds a predetermined threshold value. In some embodiments, $\Delta_{FAC}$ is an absolute value and does not take into account whether the aircraft is left or right of the centerline of the runway. In some embodiments, flight path alert manager 616 determines whether the pilot should perform a go-around maneuver using the following conditions:

If: $\Delta_{FAC} > Y$    Then: Go Around Alert

Else          No Alert where Y is a predetermined threshold value provided by criteria database 610. In some embodiments, Y is determined based on airport parameters, aircraft parameters, etc. In some embodiments, $\Delta_{FAC}$ and Y are not actual values of lateral offset, but are rather lateral deviation values which are correlated to an amount of lateral offset. For example, in some embodiments, Y is 1.5 dots on a HUD or PFD lateral deviation display. In some embodiments, if $\Delta_{FAC}$ exceeds 1.5 dots (either to the left or the right of the centerline of the runway), flight path alert manager 616 determines that the pilot should perform a go-around maneuver.

Similarly, in some embodiments, flight path alert manager 616 receives descent rate and determines if a go-around maneuver should be performed based on descent rate. In some embodiments, descent rate is represented by the variable $v_{DR}$. In some embodiments, a difference between descent rate of the aircraft and a reference descent rate value is determined by flight path alert manager 616 using the equation: $\Delta_{DR} = v_{DR} - v_{DR,ref}$, where $\Delta_{DR}$ is a difference in descent rate, $v_{DR}$ is current descent rate or the aircraft, and $v_{DR,ref}$ is a reference descent rate. In some embodiments, if flight path alert manager 616 determines that $v_{DR}$ exceeds a threshold descent rate value, flight path alert manager 616 determines that a go-around maneuver should be performed. In some embodiments, flight path alert manager 616 determines whether the pilot should perform a go-around maneuver using the following conditions:

If: $v_{DR} > v_{DR,max}$    Then: Go Around Alert

Else          No Alert where $v_{DR,max}$ is a maximum allowable descent rate (e.g., 1000 fpm below 500 ft height above ground level). In some embodiments, $v_{DR,max}$ is provided to flight path alert manager 616 by criteria database 610. In some embodiments, $v_{DR,max}$ is determined based on any of aircraft specifications, runway/airport specifications, etc. For example, a business jet may have a different maximum allowable descent rate than a wide body airliner, according to some embodiments.

In some embodiments, flight path alert manager 616 analyzes the difference $\Delta_{DR}$ between descent rate of the aircraft and the reference descent rate value. In some embodiments, flight path alert manager 616 compares the difference $\Delta_{DR}$ to a maximum allowable descent rate deviation. In some embodiments, flight path alert manager 616 determines whether the pilot should perform a go-around maneuver using the following conditions:

If: $\Delta_{DR} > \Delta_{DR,max}$    Then: Go Around Alert

Else          No Alert where $\Delta_{DR,max}$ is a maximum allowable deviation of the aircraft descent rate from a reference (e.g., desired) descent rate value.

It should be noted that flight path alert manager 616 analyzes any other flight path variables, according to some embodiments. In some embodiments, flight path alert manager 616 compares each of the flight path variables to a threshold value, and determines that a go-around maneuver should be performed in response to the flight path variable exceeding the threshold value. In some embodiments, flight path alert manager 616 determines a difference between each of the flight path variables and a reference value. In some embodiments, if the difference exceeds a maximum allowable deviation value, flight path alert manager 616 determines that a go-around maneuver should be performed.

Airspeed Alert Manager

In some embodiments, airspeed alert manager 614 is configured to receive and analyze any airspeed information from information inputs 628. In some embodiments, airspeed alert manager 614 is configured to determine if a go-around maneuver should be performed based on the airspeed information. In some embodiments, airspeed alert manager 614 receives any of indicated airspeed, calibrated airspeed, equivalent airspeed, true airspeed, ground speed, etc.

In some embodiments, airspeed alert manager 614 compares the airspeed, $v_{airspeed}$ to a maximum (or minimum) airspeed value $v_{airspeed,max}$, provided by criteria database 610. In some embodiments, airspeed alert manager 614 determines whether a go-around maneuver should be performed using the following conditions:

$$\text{If: } v_{airspeed} > +v_{airspeed,max} \quad \text{Then: Go Around Alert}$$
$$\text{If: } v_{airspeed} < v_{airspeed,min} \quad \text{Then: Go Around Alert}$$
$$\text{Else} \qquad\qquad\qquad \text{No Alert}$$

In some embodiments, airspeed alert manager 614 takes into account wind gust, including a gust factor for positive airspeed values. In some embodiments, airspeed alert manager 614 determines whether a go-around maneuver should be performed using the following conditions:

$$\text{If: } v_{airspeed} > 1.1(v_{ref} + GF) \quad \text{Then: Go Around Alert}$$
$$\text{If: } v_{airspeed} < 1.1(v_{ref}) \quad \text{Then: Go Around Alert}$$
$$\text{Else} \qquad\qquad\qquad \text{No Alert}$$

where $v_{ref}$ is a reference approach speed value, and GF is a gust factor. As shown in the conditions above, airspeed alert manager 614 determines that a go-around maneuver should be performed if the airspeed is 10% greater than the reference approach speed value plus the gust factor, or if the airspeed is 10% less than the reference approach speed value, according to some embodiments. In some embodiments, airspeed alert manager 614 determines that a go-around maneuver should be performed if the airspeed is 9% greater than the reference airspeed value plus the gust factor, 8% greater than the reference airspeed value plus the gust factor, 11%, 12%, etc., and similarly for the condition If: $v_{airspeed} < 1.1(v_{ref})$.

Runway Alert Manager

Referring still to FIG. 6, runway alert manager 612 is configured to analyze runway information received from information inputs 628 and determine if a go-around maneuver should be performed. In some embodiments, runway alert manager 612 receives an estimated touchdown location, and a speed of the aircraft. In some embodiments, runway alert manager 612 determines an available amount of stopping distance beyond the estimated touchdown location. In some embodiments, runway alert manager 612 uses any of a table, an equation, a function, etc., to determine a required stopping distance for the given aircraft at a particular speed. In some embodiments, runway alert manager 612 receives an estimated stopping distance required to stop the aircraft at the current speed. In some embodiments, runway alert manager 612 determines whether a go-around should be performed based on the following conditions:

$$\text{If: } d_{stop,required} > d_{stop,available} \quad \text{Then: Go Around Alert}$$
$$\text{Else} \qquad\qquad\qquad \text{No Alert}$$

where $d_{stop,required}$ is a distance (e.g., distance 706 as shown in FIG. 7) required to stop the aircraft given the aircraft specifications (e.g., weight, occupancy, braking systems, frictional coefficients, etc.) and speed, and $d_{stop,available}$ is a length of the runway available for stopping (e.g., distance 704 as shown in FIG. 7) beyond the estimated touchdown location (e.g., touchdown point 212/312).

Weighted Alert Manager

Weighted alert manager 618 is configured to determine a weighted function which takes into account some or all of the information provided by information inputs 628, according to some embodiments. For example, in some embodiments, flight path alert manager 616, airspeed alert manager 614, and runway alert manager 612 are configured to output binary values, either indicating no alert, or indicating an alert. In some embodiments, the conditions described above with reference to runway alert manager 612, airspeed alert manager 614, and flight path alert manager 616 are used by weighted alert manager as follows:

$$\text{If: } -X_1 < \Delta_{GP} < +X_2 \quad \text{Then: } c_1 = 0$$
$$\text{Else} \qquad\qquad c_1 = 1$$
$$\text{If: } \Delta_{FAC} > Y \quad \text{Then: } c_2 = 1$$
$$\text{Else} \qquad c_2 = 0$$
$$\text{If: } v_{DR} > v_{DR,max} \quad \text{Then: } c_3 = 1$$
$$\text{Else} \qquad c_3 = 0$$
$$\text{If: } v_{airspeed} > 1.1(v_{ref} + GF) \quad \text{Then: } c_4 = 1$$
$$\text{If: } v_{airspeed} < 1.1(v_{ref}) \quad \text{Then: } c_5 = 1$$
$$\text{Else} \qquad c_4 = c_5 = 0$$
$$\text{If: } d_{stop,required} > d_{stop,available} \quad \text{Then: } c_6 = 1$$
$$\text{Else} \qquad c_6 = 0$$

where $c_1$, $c_2$, $c_3$, $c_4$, $c_5$, and $c_6$ are binary variables.

In some embodiments, weighted alert manager 618 is configured to perform any or all of the functionality of flight path alert manager 616, airspeed alert manager 614, and runway alert manager 612 to determine $c_1$, $c_2$, $c_3$, $c_4$, $c_5$, and $c_6$. In some embodiments, flight path alert manager 616, airspeed alert manager 614, and runway alert manager 612 are configured to determine $c_1$, $c_2$, $c_3$, $c_4$, $c_5$, and $c_6$ and provide $c_1$, $c_2$, $c_3$, $c_4$, $c_5$, and $c_6$ to weighted alert manager 618.

In some embodiments, weighted alert manager 618 determines a weighted function based on $c_1$, $c_2$, $c_3$, $c_4$, $c_5$, and $c_6$, shown below:

$$\bar{c} = c_1 w_1 + c_2 w_2 + c_3 w_3 + c_4 w_4 + c_5 w_5 + c_6 w_6$$

where $\bar{c}$ is a weighted average of $c_1$, $c_2$, $c_3$, $c_4$, $c_5$, and $c_6$, and $w_1$, $w_2$, $w_3$, $w_4$, $w_5$, and $w_6$ are weights associated with a corresponding c. In some embodiments, the weighted function is expressed as:

$$\bar{c} = \sum_{i=1}^{n} c_i w_i$$

where n is a number of trigger/monitored variables.

In some embodiments, weighted alert manager 618 determines if a go-around maneuver should be performed based on $\bar{c}$ and conditions as follows:

If: $\bar{c} > \bar{c}_{max}$    Then: Go Around Alert
        Else            No Alert where $\bar{c}_{max}$ is a threshold value of $\bar{c}$.

In some embodiments, weighted alert manager 618 determines a weighted function based on deviation values for each variable (e.g., a deviation of airspeed relative to a reference approach speed value). In this way, the magnitude of deviation is taken into account in the weighted function, according to some embodiments. In some embodiments, the weighted function which takes into account deviations of each variable is defined as:

$$\bar{c} = \Delta_{GP} W_1 + \Delta_{FAC} W_2 + \Delta_{DR} W_3 + \Delta_{airspeed,GF} W_4 + \Delta_{airspeed} W_5 + \Delta_{stopping} W_6$$

where $\Delta_{GP}$ is a deviation of the aircraft above or below a desired glidepath, $\Delta_{FAC}$ is a lateral deviation of the aircraft from a centerline of the runway, $\Delta_{DR}$ is a deviation of the aircraft descent rate relative to a reference (e.g., desired) descent rate, $\Delta_{airspeed,GF} = v_{airspeed} - (v_{ref} + GF)|v_{airspeed} > (v_{ref} + GF)$, $\Delta_{airspeed} = \text{abs}(v_{airspeed} - v_{ref})|v_{airspeed} < v_{ref}$, $\Delta_{stopping} = d_{stop,required} - d_{stop,available}|d_{stop,required} > d_{stop,available}$, and $W_1$, $W_2$, $W_3$, $W_4$, $W_5$, and $W_6$ are weights. In some embodiments, weighted alert manager 618 determines that a go-around maneuver should be performed if $\bar{c}$ exceeds a predetermined threshold value.

In some embodiments, any of the w or W weights are tuned to achieve a weighted function which accurately determines if a go-around maneuver should be performed. In some embodiments, the w or W weights are stored in criteria database 610 and provided to weighted alert manager 618. In some embodiments, the w or W weights are adjusted such that the weighted function is more sensitive to particular variables. For example, in some embodiments, the stopping distance is a requirement, and as such, $w_6$ and/or $W_6$ are values such that if $c_6$ or $\Delta_{stopping}$ are any non-zero positive value, then $\bar{c}$ exceeds $\bar{c}_{max}$. In some embodiments, the values of weights $W_1$, $W_2$, $W_3$, $W_4$, $W_5$, and $W_6$ and/or and $w_1$, $w_2$, $w_3$, $w_4$, $w_5$, and $w_6$ are determined using a machine learning algorithm. In some embodiments, the machine learning algorithm is any of a supervised learning algorithm, a semi-supervised learning algorithm, an unsupervised learning algorithm, a reinforcement learning algorithm, an artificial neural network, a support vector machine, a Bayesian network, etc. In some embodiments, the weights of $W_1$, $W_2$, $W_3$, $W_4$, $W_5$, and $W_6$ and/or and $w_1$, $w_2$, $w_3$, $w_4$, $w_5$, and $w_6$ are determined offline and stored in criteria database 610 when software is loaded onto go-around advisor controller 600.

Alert Manager

Referring still to FIG. 6, go-around advisor controller 600 is shown to include alert manager 622, according to some embodiments. In some embodiments, alert manager 622 receives any identified alerts from alert generator 608 (e.g., from one of or a combination of flight path alert manager 616, airspeed alert manager 614, runway alert manager 612, weighted alert manager 618) and determines control signals for alert system 104. In some embodiments, alert manager 622 receives a cause of the go-around alert from alert generator 608. In some embodiments, alert manager 622 is configured to cause alert system 104 to provide any of a visual and an aural alert to the pilot, as well as an informational display of a cause of the go-around alert.

Go-Around Manager

Referring still to FIG. 6, go-around advisor controller 600 is shown to include a Go-Around (GA) manager 620 and wireless radio 632, according to some embodiments. In some embodiments, wireless radio 632 is any of a wireless transceiver, receiver, etc., configured to wirelessly communicate with ATC 630. In some embodiments, GA manager 620 receives go-around commands/notifications from wireless radio 632. In some embodiments, wireless radio 632 facilitates receiving and/or sending wireless communications between go-around advisory controller 600 and ATC 630. In some embodiments, wireless radio 632 is a component of a Controller Pilot Data Link Communications system. In some embodiments, GA manager 620 receives the go-around notification from ATC 630 and automatically initiates a go-around sequence, described in greater detail below with reference to FIG. 11. In some embodiments, the communication received from ATC 630 is any of a voice command and a datalink command.

In some embodiments, GA manager 620 is configured to automatically initiate the go-around sequence in response to receiving a notification from any of alert manager 622 and alert generator 608 regarding a go-around alert.

In some embodiments, GA manager 620 causes wireless radio 632 to transmit a message to ATC 630 in response to initiating the go-around sequence. In some embodiments, GA manager 620 causes wireless radio 632 to transmit a message to ATC 630 in response to the pilot initiating a go-around maneuver. In some embodiments, GA manager 620 automatically causes wireless radio 632 to send a "Going Around" message to ATC via either a voice communication and/or a datalink communication in response to at least one of the pilot initiating a go-around maneuver and initiating a go-around sequence.

Referring still to FIG. 6, GA manager 620 is shown sending GA control signals to GA switch 626, according to some embodiments. In some embodiments, the GA control signals sent to TOGA switch 626 cause TOGA switch 626 to initiate the go-around sequence, as described in greater detail below with reference to FIG. 11.

Advantageously, automatically initiating a go-around sequence with GA manager 620 facilitates the use of go-around advisor controller 600 for use with reduced crew operations, optionally piloted, and/or fully autonomous operations, according to some embodiments.

Go-Around Advisory Methods

Figure 8A:
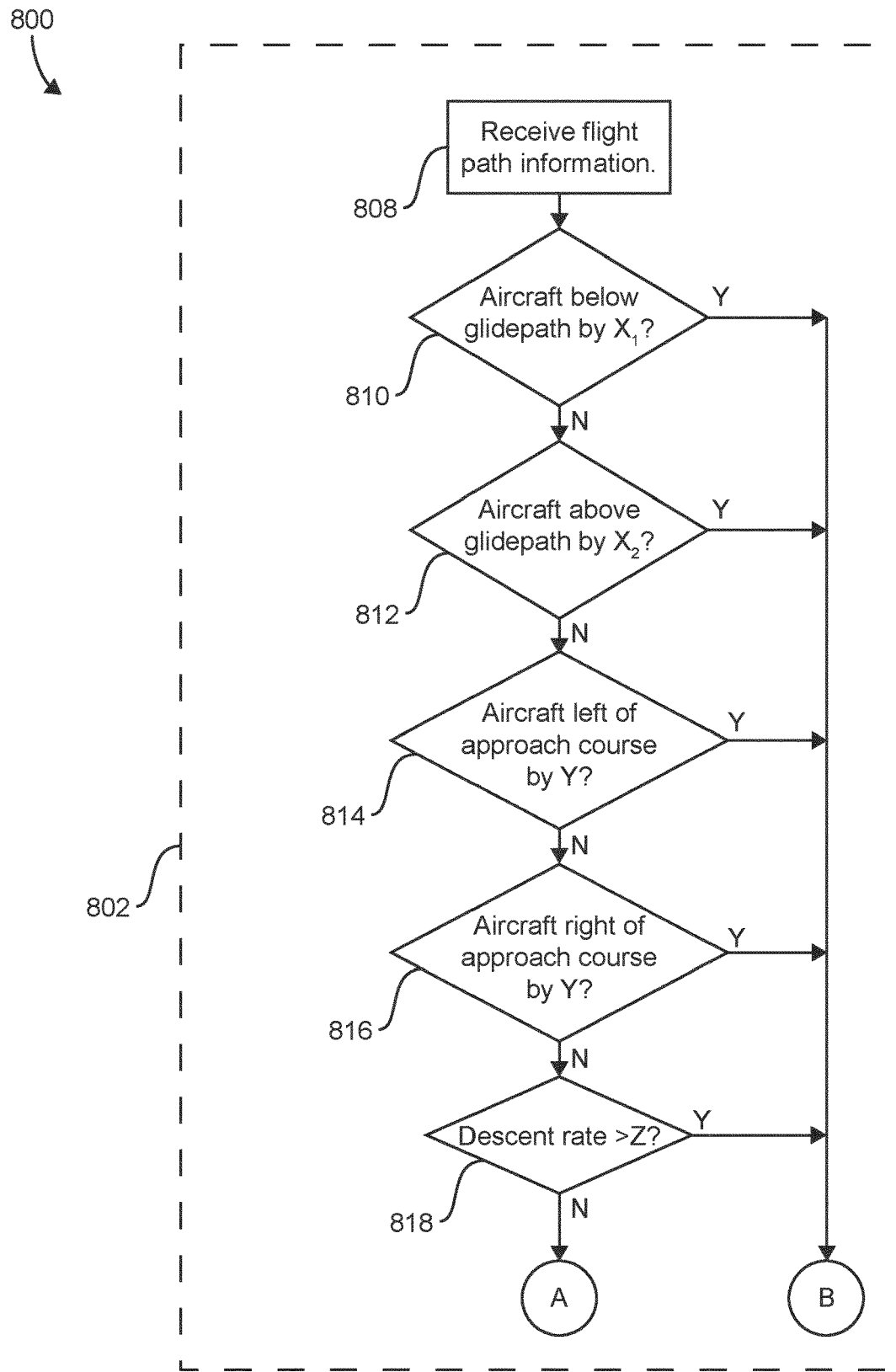
FIGS. 8A-B are a method for determining if a go-around maneuver should be performed, according to some embodiments.
Figure 8B:
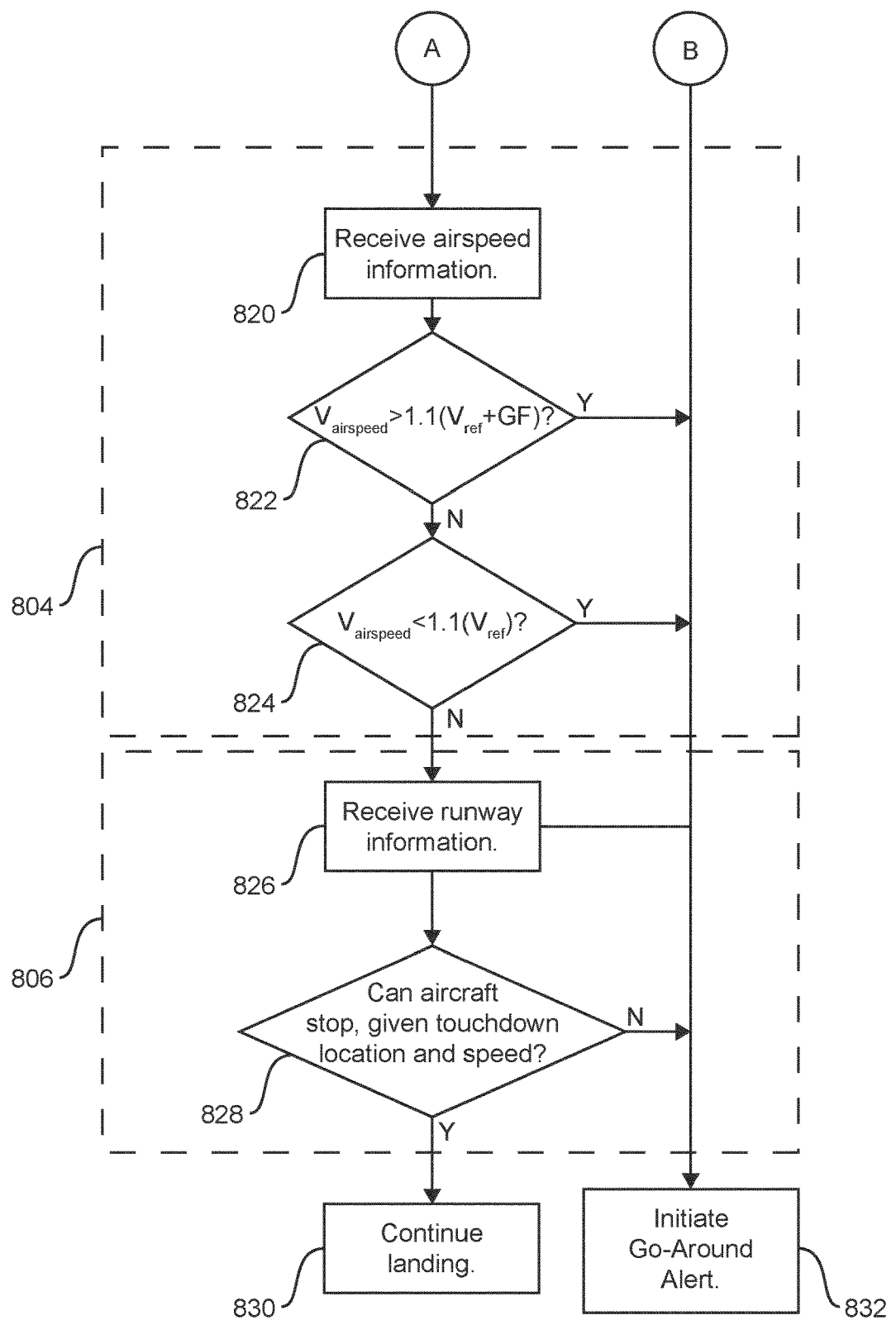
Figure 9:
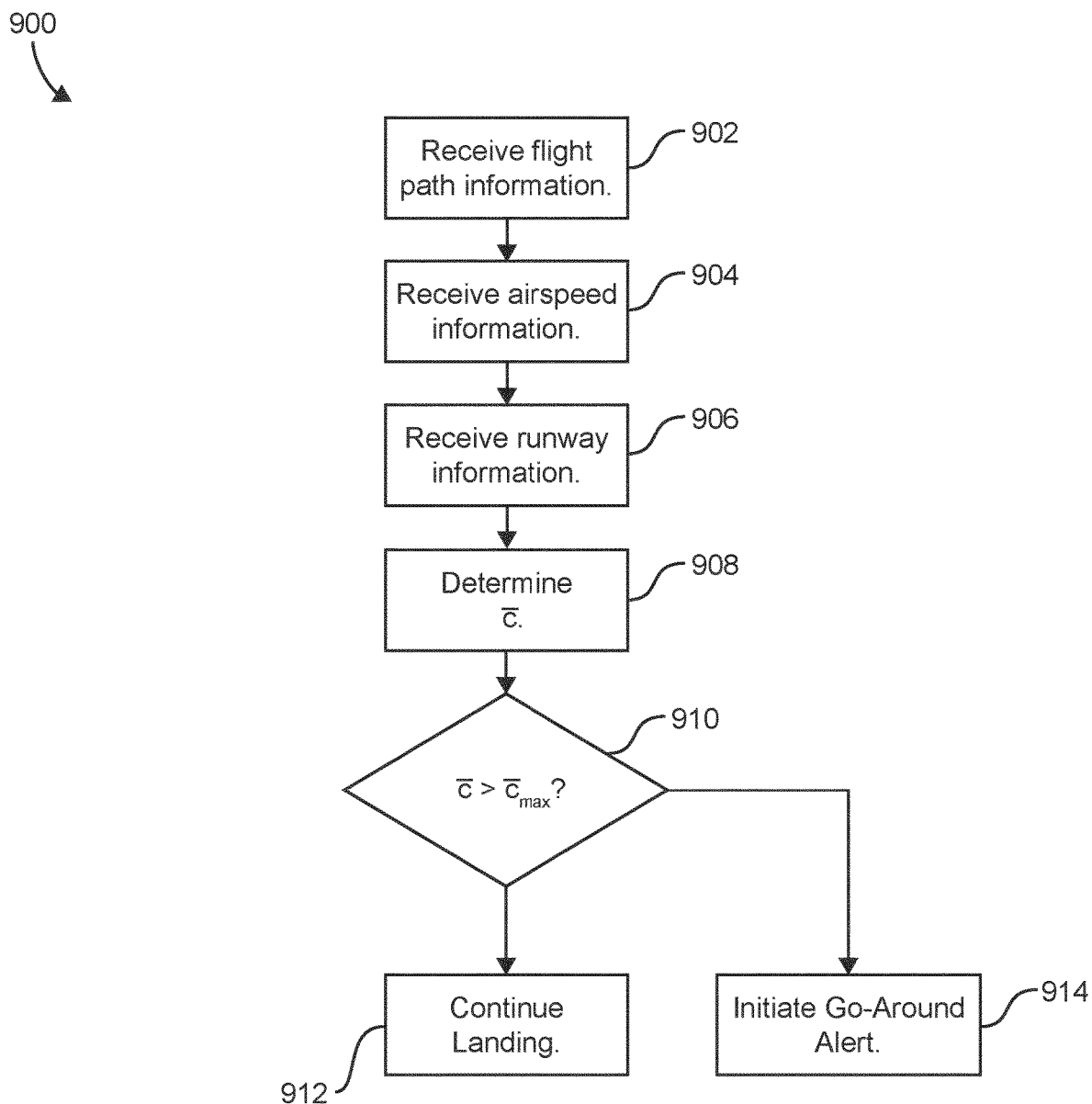
FIG. 9 is a method for determining if a go-around maneuver should be performed, according to some embodiments.

Referring now to FIGS. 8-9, various methods of determining a go-around alert, are shown, according to some embodiments. In some embodiments, go-around advisor controller 600 uses any of the methods described herein to alert the pilot that a go-around maneuver should be performed.

Single Criteria Alert Determination

Referring now to FIGS. 8a-8b, a method 800 for determining a go-around alert based on at least one positive trigger, is shown, according to some embodiments. Method 800 is divided into a flight path information analysis 802, an airspeed information analysis 804, and a runway information analysis 806, according to some embodiments. In some embodiments, flight path information analysis 802 is performed by flight path alert manager 616. In some embodiments, airspeed information analysis 804 is performed by airspeed alert manager 614. In some embodiments, runway information analysis 806 is performed by runway alert manager 612. Flight path information analysis 802 includes steps 808-818, airspeed information analysis 804 includes steps 820-824, and runway information analysis 806 includes steps 826-828, according to some embodiments.

Method 800 includes receiving flight path information (step 808), according to some embodiments. In some embodiments, the flight path information is received by any of weighted alert manager 618, flight path alert manager 616, and alert generator 608. In some embodiments, the flight path information is received through communications interface 624 from information inputs 628. The flight path information includes variables including, but not limited to, glidepath variables, a deviation of the aircraft from a desired glidepath, a lateral deviation of the aircraft from an approach course, descent rate, etc., or any other variables which are relevant to determining if the aircraft should perform a go-around maneuver.

Method 800 includes determining if the aircraft is below a desired glidepath by an amount $X_1$ (step 810), according to some embodiments. In some embodiments, if the aircraft is below the desired glidepath by amount $X_1$ or a distance greater than amount $X_1$, method 800 proceeds to step 832 to initiate a go-around alert. In some embodiments, if the aircraft is below the desired glidepath by an amount less than amount $X_1$ or is above the desired glidepath, method 800 proceeds to step 812. In some embodiments, step 810 is performed by flight path alert manager 616, or weighted alert manager 618, or alert generator 608.

Method 800 includes determining if the aircraft is above the desired glidepath by an amount $X_2$ (step 812), according to some embodiments. In some embodiments, if the aircraft is above the desired glidepath by amount $X_2$, or a distance greater than amount $X_2$, method 800 proceeds to step 832 to initiate a go-around alert. In some embodiments, if the aircraft is above the desired glidepath by an amount less than amount $X_2$, method 800 proceeds to step 814. In some embodiments, step 812 is performed by flight path alert manager 616, or weighted alert manager 618, or alert generator 608.

Method 800 includes determining if the aircraft is left or right (e.g., lateral distance) from an approach course to the runway by an amount Y (steps 814 and 816), according to some embodiments. In some embodiments, if the aircraft is left or right of the approach course (e.g., centerline of the runway) by Y or greater, method 800 proceeds to step 832 to initiate the go-around alert. In some embodiments, if the aircraft is left or right of the approach course by a distance less than Y, method 800 proceeds to step 818. In some embodiments, steps 814 and 816 are performed by flight path alert manager 616, or weighted alert manager 618, or alert generator 608.

Method 800 includes determining if a descent rate of the aircraft is greater than an amount Z (step 818), according to some embodiments. In some embodiments, if the descent rate of the aircraft is greater than the amount Z, method 800 proceeds to step 832 to initiate the go-around alert. In some embodiments, if the descent rate of the aircraft is less than the amount Z, method 800 proceeds to the airspeed information analysis 804 (step 820). In some embodiments, step 818 is performed by flight path alert manager 616, or weighted alert manager 618, or alert generator 608.

Method 800 includes receiving airspeed information (step 820), according to some embodiments. In some embodiments, the airspeed information is received by any of weighted alert manager 618, airspeed alert manager 614, and alert generator 608. In some embodiments, the airspeed information is received through communications interface 624 from information inputs 628. The flight path information includes variables including, but not limited to, airspeed variables, a deviation of the airspeed from a reference approach speed, etc., or any other variables which are relevant to determining if the aircraft should perform a go-around maneuver based on the airspeed.

Method 800 includes determining if the airspeed ($v_{airspeed}$ or $v_a$) is 10% greater than a reference approach speed ($v_{ref}$) plus a gust factor (GF) (step 822), according to some embodiments. In some embodiments, if the airspeed is 10% greater than the reference approach speed plus the gust factor, method 800 proceeds to step 832 to initiate the go-around alert. In some embodiments, if the airspeed is not 10% greater than the reference approach speed plus the gust factor, method 800 proceeds to step 824. In some embodiments, step 822 is performed by airspeed alert manager 614, or weighted alert manager 618, or alert generator 608.

Method 800 includes determining if the airspeed is 10% less than the reference approach speed (step 824), according to some embodiments. In some embodiments, if the airspeed is at least 10% less than the reference approach speed, method 800 proceeds to step 832 to initiate the go-around alert. In some embodiments, if the airspeed is not at least 10% less than the reference approach speed, method 800 proceeds to runway information analysis 806. In some embodiments, step 824 is performed by airspeed alert manager 614, or weighted alert manager 618, or alert generator 608.

Method 800 includes receiving runway information (step 826), according to some embodiments. In some embodiments, the runway information is information from a Synthetic Vision System or an Enhanced Vision System. In some embodiments, the runway information is received by any of weighted alert manager 618, runway alert manager 612, and alert generator 608. In some embodiments, the runway information includes or is information regarding estimated touchdown location, speed of aircraft, etc.

Method 800 includes determining if the aircraft can stop given touchdown location and speed of the aircraft (step 828), according to some embodiments. In some embodiments, if the aircraft cannot stop in a remaining runway distance given the estimated touchdown location and speed of the aircraft, method 800 proceeds to step 832 to initiate the go-around alert. In some embodiments, if the aircraft can stop given the touchdown location and speed of the aircraft, method 800 proceeds to step 830 to continue the landing. Step 828 may be performed by any of weighted alert manager 618, alert generator 608, and runway alert manager 612, according to some embodiments.

Method 800 as shown in FIGS. 8a-8b proceeds to step 832 to initiate the go-around alert based on any one of the criteria of steps 810-818, 822-824, and 828 yielding a result which indicates that a go-around maneuver should be performed, according to some embodiments. In some embodiments, steps 808-828 are performed simultaneously, and the go-around alert is initiated (step 832) in response to any of the criteria yielding a result which indicates that a go-around maneuver should be performed.

Multiple Criteria Alert Determination

In some embodiments, method 800 is modified such that two or more criteria must be met before proceeding to step 832 to initiate the go-around alert. For example, when one of the criteria is met, a counter is increased from 0 to 1, according to some embodiments. In some embodiments, method 800 does not proceed to step 832 until another criteria has been met and the counter is increased from 1 to 2. In some embodiments, some combination of criteria must be met before method 800 proceeds to step 832. For example, in some embodiments, the criteria shown in step 818 and the criteria shown in step 822 must be triggered before method 800 proceeds to step 832. In some embodiments, two or more criteria must be triggered, three or more criteria, etc. In some embodiments, any combination of one or more of the criteria in steps 810-818, 822-824, and 828 must be met before method 800 proceeds to step 832.

Weighted Average Alert Determination

Referring now to FIG. 9, method for determining if a go-around maneuver should be performed, method 900 is shown, according to some embodiments. In some embodiments, method 900 is a method which includes determining a weighted average of the various criteria as described in greater detail above with reference to FIGS. 8A-8B and FIG. 6.

Method 900 includes receiving flight path information (step 902), receiving airspeed information (step 904) and receiving runway information (step 906), according to some embodiments. In some embodiments, step 902 of method 900 is step 808 of method 800, step 904 of method 900 is step 820 of method 800, and step 906 of method 900 is step 826 of method 800.

Method 900 includes determining $\bar{c}$ (step 908) and determining if $\bar{c}$ is greater than $\bar{c}_{max}$ (step 910), according to some embodiments. In some embodiments, $\bar{c}$ is determined according to either of the weighted functions described in greater detail above with reference to FIG. 6. In some embodiments, if $\bar{c}$ is less than method 900 proceeds to step 912 and the landing is continued. In some embodiments, if $\bar{c}$ is greater than $\bar{c}_{max}$, method 900 proceeds to step 914 and initiates a go-around alert or an auto-flight, auto-throttle, auto-pilot system, or any other appropriate response.

Weighted Average and Overriding Criteria Alert Determination

In some embodiments, methods 800 and 900 are combined. For example, go-around advisor controller 600 performs method 900 and 800 simultaneously, according to some embodiments. In some embodiments, go-around advisor controller 600 performs method 900 until a specific criteria of method 800 is met/triggered (e.g., step 828). In some embodiments, if the specific criteria is met/triggered, go-around advisor controller 600 initiates the go-around alert, regardless of whether or not $\bar{c}$ is greater than $\bar{c}_{max}$. In this way, a specific criteria which is necessary for a proper landing is given weight over the weighted function and the value of $\bar{c}$ (i.e., overrides the weighted function). In some embodiments, the same results are achieved by increasing the weight associated with the specific criteria which is necessary for a proper landing, such that if the specific criteria is triggered, $\bar{c}$ is greater than $\bar{c}_{max}$.

Alert System

Figure 10:
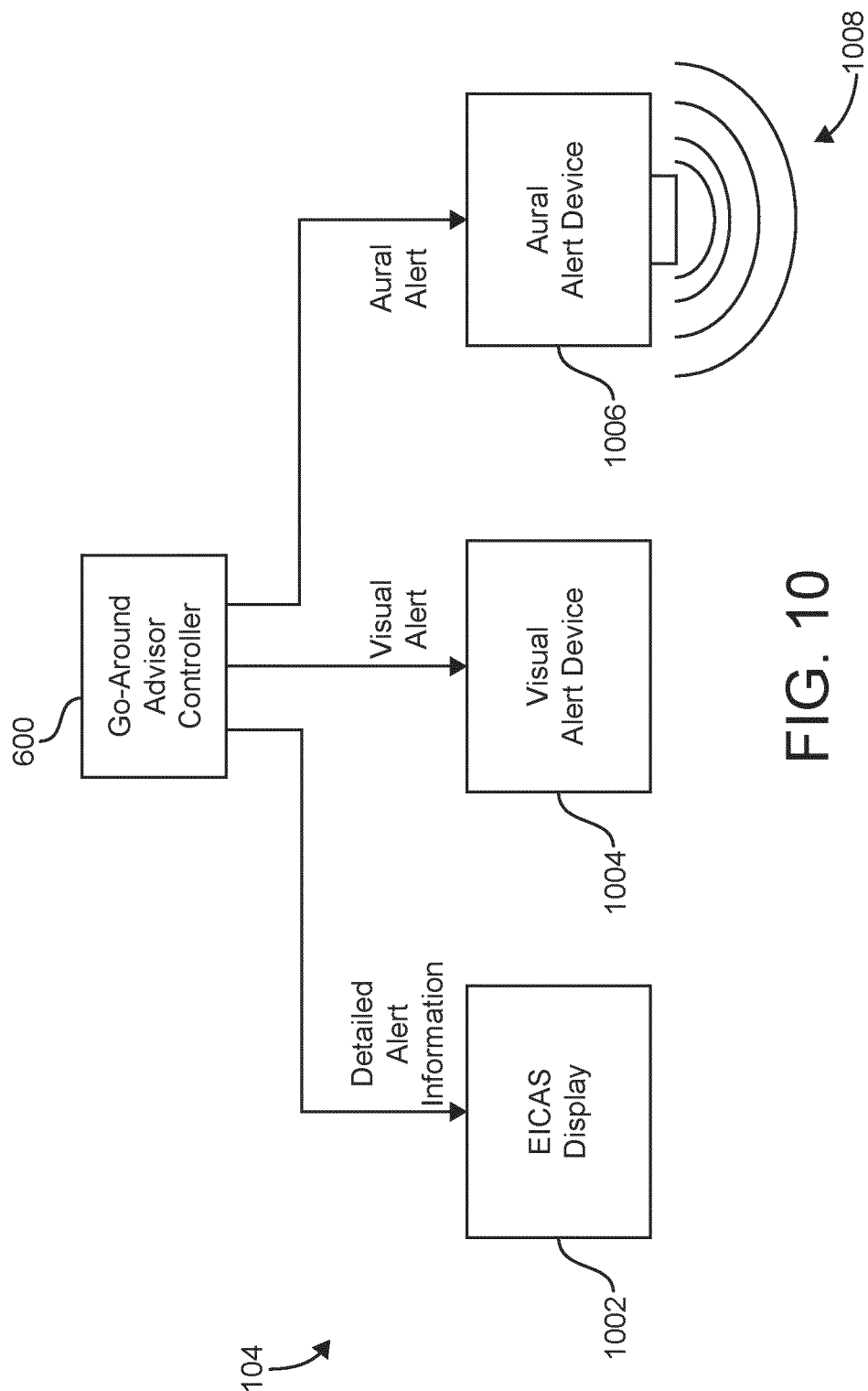
FIG. 10 is a block diagram of an alert system configured to provide a pilot with a go-around alert, according to some embodiments.

Referring now to FIG. 10, alert system 104 is shown in greater detail, according to some embodiments. In some embodiments, alert system 104 includes a visual alert device 1004, an aural alert device 1006, and an engine-indicating and crew alerting system (EICAS) display 1002. In some embodiments, alert system 104 receives any of detailed alert information, visual alert control signals, and aural alert control signals, according to some embodiments. In some embodiments, aural alert device 1006 receives the aural alert control signals and generates an aural alert 1008, visual alert device 1004 receives the visual alert control signals and generates a visual alert, and EICAS display 1002 receives the detailed alert information and provides the detailed alert information to a user (e.g., by a visual alert or a user interface).

Visual Alert

Referring still to FIG. 10, visual alert device 1004 is shown receiving visual alert control signals from go-around advisor controller 600, according to some embodiments. In some embodiments, the visual alert control signals cause visual alert device 1004 to provide the visual alert(s) to a user (e.g., the pilot of the aircraft). In some embodiments, visual alert device 1004 is a single alert device, or a collection of alert devices, configured to provide a visual alert to a user (e.g., the pilot) of the aircraft. In some embodiments, visual alert device 1004 is or includes the aircraft HUD, a primary flight display (PFD), etc. In some embodiments, visual alert device 1004 is or includes various light emitting devices configured to notify the user that a go-around maneuver should be performed. In some embodiments, the visual alert is a textual alert, a message, a notification, etc., which indicates that a go-around maneuver should be performed. For example, if visual alert device 1004 includes a user interface (e.g., a screen, a display device, etc.), the visual alert includes a message "GO AROUND" or "ABORT LANDING" according to some embodiments. In some embodiments, the visual alert includes intermittently blinking the message/notification to the pilot in order to ensure that the pilot notices the alert. In some embodiments, the visual alert includes actuating one or more lights. In some embodiments, the lights are lights disposed about the cockpit of the aircraft, and the actuating (e.g., blinking, pulsing, color change, etc.) provides the pilot with the notification to perform the go-around maneuver. In some embodiments, the visual alert is repeated until the pilot initiates the go-around maneuver.

Figure 12:
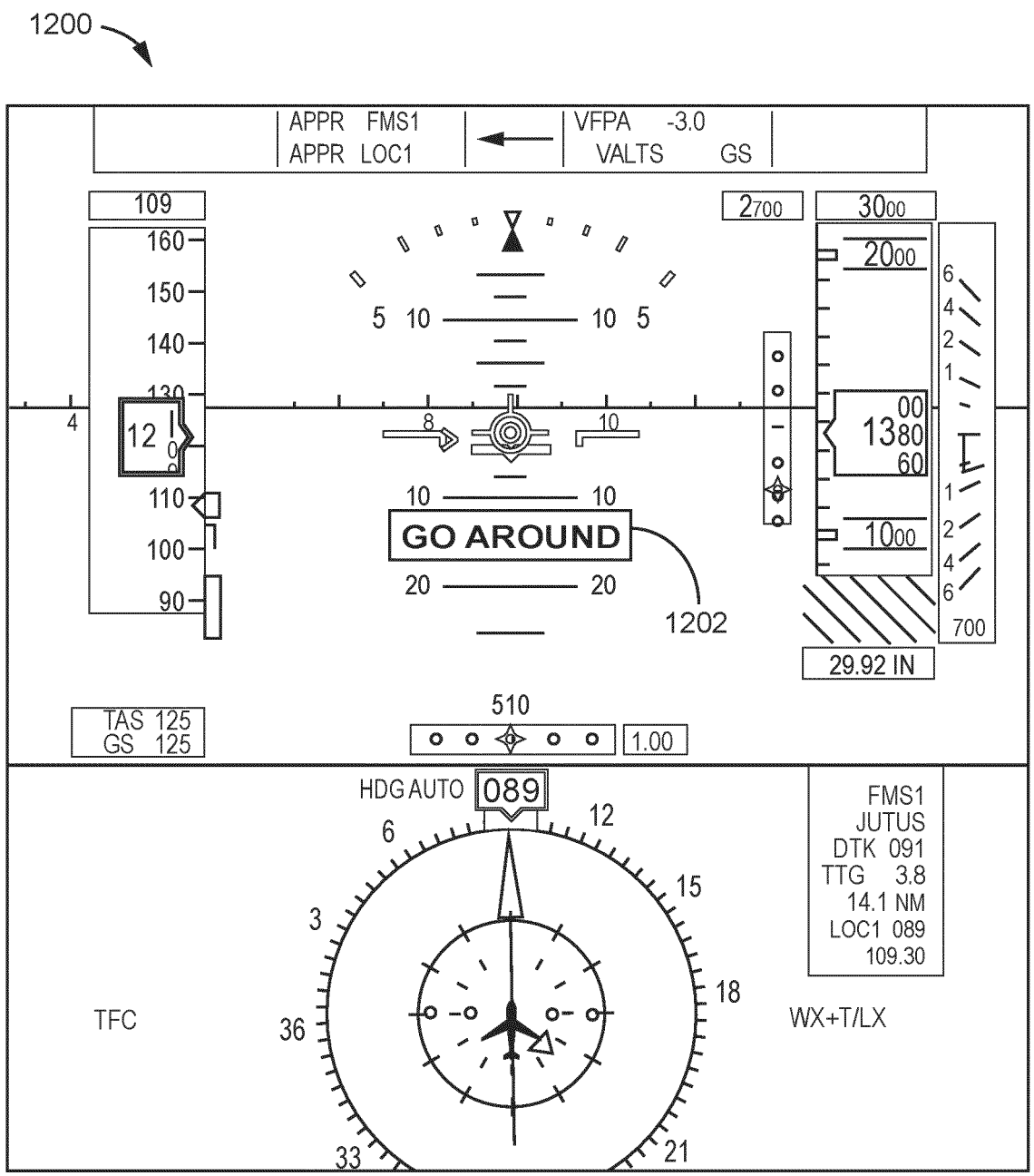
FIG. 12 is a display, showing an alert for a go around maneuver, according to some embodiments.

Referring now to FIG. 12, a visual display 1200 is shown, according to some embodiments. Visual display 1200 shows a visual alert 1202 indicating that a go-around maneuver should be performed, according to some embodiments. In some embodiments, visual display 1200 is a visual representation of a HUD, which visual alert 1202 (e.g., the visual alert of visual alert device 1004 which notifies the pilot to perform a go-around maneuver) is displayed within. In some embodiments, visual display 1200 is an example of a visual alert which visual alert device 1004 displays.

Aural Alert

Referring again to FIG. 10, aural alert device 1006 is shown receiving aural alert control signals from go-around advisor controller 600, according to some embodiments. In some embodiments, the aural alert control signals cause aural alert device 1006 to provide an aural alert to a user (e.g., the pilot). In some embodiments, aural alert device 1006 is any of a speaker system, an aircraft speaker system, etc. In some embodiments, the aural alert is any of a spoken alert (e.g., a computer generated voice), a beep, a buzz, etc., or any other aural alert which indicates that a go-around maneuver should be performed. For example, in some embodiments, the aural alert is a narrated aural alert, stating "GO AROUND" or "ABORT LANDING." Similar to the visual alert, in some embodiments, the aural alert is repeated until the pilot initiates the go-around maneuver.

Detailed Alert Information

Referring still to FIG. 10, EICAS display 1002 is shown receiving detailed alert information from go-around advisor controller 600, according to some embodiments. In some embodiments, the detailed alert information includes information regarding the cause of the go-around alert. In some embodiments, the detailed alert information causes EICAS display 1002 to display the cause of the go-around alert to the pilot. For example, if the go-around alert is initiated because the aircraft is approaching the runway at an excessive speed, EICAS display 1002 displays "Too Fast—Approach Unstable" according to some embodiments. In some embodiments, EICAS display 1002 displays a readout specifying specific values of any of the criterion used to determine that the go-around maneuver should be performed. For example, EICAS display 1002 displays aircraft speed information if the go-around alert was initiated due to excessive aircraft speed, according to some embodiments. In some embodiments, the detailed alert information is displayed on a horizontal situation indicator (HSI) instead of or in addition to EICAS display 1002. Likewise, the detailed alert information is displayed on any other display device present on the aircraft to provide a user (e.g., the pilot) with the detailed alert information regarding the go-around alert, according to some embodiments.

Go-Around Sequence

Figure 11:
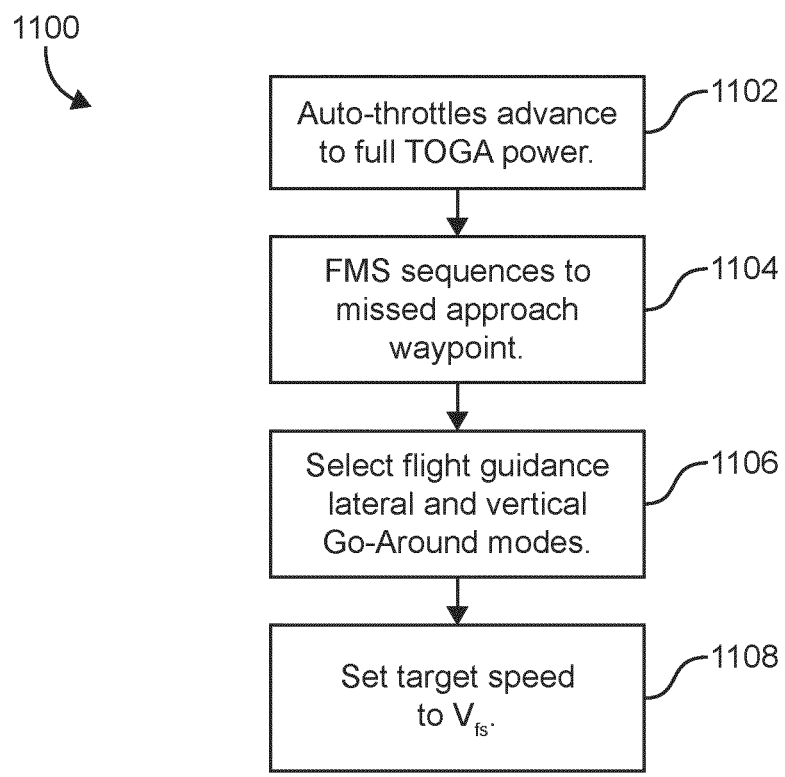
FIG. 11 is a method for performing a go-around maneuver, according to some embodiments.

Referring now to FIG. 11, process 1100 of a go-around sequence is shown, according to some embodiments. In some embodiments, the go-around sequence is initiated automatically by GA manager 620. Process 1100 is shown to include auto-throttling to full TOGA power (step 1102), according to some embodiments. In some embodiments, step 1102 is initiated by TOGA switch 626 in response to a command from GA manager 620, or more generally, go-around advisory controller 600. In some embodiments, step 1102 is performed by an auto-throttle system. In some embodiments, the full TOGA power is a predetermined throttle position.

Process 1100 includes the FMS sequencing the aircraft path to a missed approach waypoint (step 1104), according to some embodiments. In some embodiments, step 1104 is performed by an FMS of the aircraft. Process 1100 includes selecting flight guidance lateral and vertical go-around modes (step 1106), according to some embodiments. In some embodiments, step 1106 is performed by an autopilot system of the aircraft or by a Flight Guidance System (FGS) of the aircraft. In some embodiments, the FGS is configured to control the aircraft to perform lateral and vertical go-around maneuvers. Process 1100 includes setting a target speed of the aircraft to $v_{fs}$ (step 1108), according to some embodiments. In some embodiments, $v_{fs}$ is a predetermined go-around speed. In some embodiments, step 1108 is performed by an autopilot system of the aircraft or a FGS.

In some embodiments, process 1100 includes automatically retracting gear and flaps of the aircraft. In this way, the go-around sequence as shown in process 1100 is automatically initiated by go-around advisor controller 600 and automatically implemented by various autopilot and avionic systems of the aircraft, according to some embodiments. This allows go-around detection and implementation to be fully automated, reducing human error, and reducing crew work requirements, according to some embodiments.

Configuration of Exemplary Embodiments

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements can be reversed or otherwise varied and the nature or number of discrete elements or positions can be altered or varied. Accordingly, all such modifications are intended to be included within the scope of the present disclosure. The order or sequence of any process or method steps can be varied or re-sequenced according to alternative embodiments. Other substitutions, modifications, changes, and omissions can be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure can be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures show a specific order of method steps, the order of the steps may differ from what is depicted. Also two or more steps can be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

What is claimed is:

1. A go-around system for an aircraft comprising:
   a controller configured to:
     receive flight path information, airspeed information, and runway information from one or more avionic systems;
     determine, based on the flight path information, airspeed information, and runway information, a go-around advisory, wherein the go-around advisory comprises a directive to perform a go-around; and output, an alert signal regarding the go-around advisory;

an alert system configured to provide at least one of a visual alert, an aural alert, and a detailed information alert to a user in response to receiving the alert signal from the controller;

an auto throttle system configured to automatically adjust a speed of the aircraft for a go-around based on the go-around advisory, wherein the flight path information comprises a vertical position of the aircraft, a desired landing path of the aircraft, a lateral position of the aircraft relative to the desired landing path, and a descent rate of the aircraft, wherein the controller is configured to:

determine a vertical difference between the vertical position of the aircraft and the desired landing path;

determine a lateral difference between the lateral position of the aircraft and the desired landing path;

compare the descent rate to a descent rate threshold value, the vertical difference to a vertical difference threshold value, and the lateral difference to a lateral difference threshold value; and determine the go-around advisory based on at least one of the descent rate exceeding the descent rate threshold value, the vertical difference exceeding the vertical difference threshold value, and the lateral difference exceeding the lateral difference threshold value.

2. A go-around system for an aircraft comprising:

a controller configured to:

receive flight path information, airspeed information, and runway information from one or more avionic systems;

determine, based on the flight path information, airspeed information, and runway information, a go-around advisory, wherein the go-around advisory comprises a directive to perform a go-around; and output, an alert signal regarding the go-around advisory;

an alert system configured to provide at least one of a visual alert, an aural alert, and a detailed information alert to a user in response to receiving the alert signal from the controller;

an auto throttle system configured to automatically adjust a speed of the aircraft for a go-around based on the go-around advisory, wherein the airspeed information comprises a reference approach speed of the aircraft, an airspeed, and a gust factor, wherein the controller is configured to:

determine a first airspeed difference based on the airspeed, the reference approach speed of the aircraft, and the gust factor;

determine a second airspeed difference based on the airspeed and the reference approach speed of the aircraft; and determine the go-around advisory based on at least one of the first airspeed difference exceeding a first airspeed threshold value and the second airspeed difference exceeding a second airspeed threshold value.

3. A go-around system for an aircraft comprising:

a controller configured to:

receive flight path information, airspeed information, and runway information from one or more avionic systems;

determine, based on the flight path information, airspeed information, and runway information, a go-around advisory, wherein the go-around advisory comprises a directive to perform a go-around; and output, an alert signal regarding the go-around advisory;

an alert system configured to provide at least one of a visual alert, an aural alert, and a detailed information alert to a user in response to receiving the alert signal from the controller;

an auto throttle system configured to automatically adjust a speed of the aircraft for a go-around based on the go-around advisory, wherein the runway information comprises an estimated touchdown location and a speed of the aircraft, wherein the controller is configured to determine a required landing distance and an available landing distance based on the estimated touchdown location and the speed of the aircraft, and determine the go-around advisory based on the required landing distance exceeding the available landing distance.

4. The system of claim 3, wherein the flight path information comprises a vertical position of the aircraft, a desired landing path of the aircraft, a lateral position of the aircraft relative to the desired landing path, and a descent rate of the aircraft.

5. The system of claim 3, wherein the airspeed information comprises a reference approach speed of the aircraft, an airspeed, and a gust factor.

6. The system of claim 3, wherein the controller is configured to determine a weighted sum based on the flight path information, the airspeed information, and the runway information, and wherein the controller is further configured to generate the go-around advisory in response to the weighted sum exceeding a threshold value.

7. The system of claim 6, wherein the controller is configured to assign a weight to each of the flight path information, the airspeed information, and the runway information to determine the weighted sum.

8. The system of claim 4, wherein the controller is configured to:

determine a vertical difference between the vertical position of the aircraft and the desired landing path;

determine a lateral difference between the lateral position of the aircraft and the desired landing path;

compare the descent rate to a descent rate threshold value, the vertical difference to a vertical difference threshold value, and the lateral difference to a lateral difference threshold value; and determine the go-around advisory based on at least one of the descent rate exceeding the descent rate threshold value, the vertical difference exceeding the vertical difference threshold value, and the lateral difference exceeding the lateral difference threshold value.

9. The system of claim 5, wherein the controller is configured to:

determine a first airspeed difference based on the airspeed, the reference approach speed of the aircraft, and the gust factor;

determine a second airspeed difference based on the airspeed and the reference approach speed of the aircraft; and determine the go-around advisory based on at least one of the first airspeed difference exceeding a first airspeed threshold value and the second airspeed difference exceeding a second airspeed threshold value.

10. The system of claim 3, wherein the detailed information alert comprises an indication of a cause of the go-around advisory and wherein the system further comprises a flight guidance system configured to automatically perform a go-around maneuver based on the go-around advisory.

11. A controller for determining a go-around advisory of an aircraft and providing a go-around advisory alert, the controller configured to:
monitor flight path information, airspeed information, and runway information, wherein the flight path information includes a flight path variable, the airspeed information includes an airspeed variable, and the runway information includes a runway variable;
determine a flight path difference between a predetermined flight path threshold value and the flight path variable, an airspeed difference between a predetermined airspeed threshold value and the airspeed variable, and a runway difference between a predetermined runway threshold value and the runway variable;
determine a go-around advisory based on at least one of the flight path difference, the airspeed difference, and the runway difference;
provide an alert regarding the go-around advisory, wherein the alert comprises at least one of a visual alert, an aural alert, and a detailed information alert; and
adjust an operation of a take off go around switch to autonomously perform a go-around.

12. The controller of claim 11, wherein the controller is further configured to determine the go-around advisory based on at least one of the flight path difference, the airspeed difference and the runway difference exceeding a predetermined threshold value.

13. The controller of claim 11, wherein the controller is further configured to determine a weighted sum based on the flight path difference, the airspeed difference, and the runway difference.

14. A controller for determining a go-around advisory of an aircraft and providing a go-around advisory alert, the controller configured to:
monitor flight path information, airspeed information, and runway information, wherein the flight path information includes a flight path variable, the airspeed information includes an airspeed variable, and the runway information includes a runway variable;
determine a flight path difference between a predetermined flight path threshold value and the flight path variable, an airspeed difference between a predetermined airspeed threshold value and the airspeed variable, and a runway difference between a predetermined runway threshold value and the runway variable;
determine a go-around advisory based on at least one of the flight path difference, the airspeed difference, and the runway difference;
provide an alert regarding the go-around advisory, wherein the alert comprises at least one of a visual alert, an aural alert, and a detailed information alert; and
determine the go-around advisory based on at least one of the flight path difference, the airspeed difference and the runway difference exceeding a predetermined threshold value.

15. A controller for determining a go-around advisory of an aircraft and providing a go-around advisory alert, the controller configured to:
monitor flight path information, airspeed information, and runway information, wherein the flight path information includes a flight path variable, the airspeed information includes an airspeed variable, and the runway information includes a runway variable;
determine a flight path difference between a predetermined flight path threshold value and the flight path variable, an airspeed difference between a predetermined airspeed threshold value and the airspeed variable, and a runway difference between a predetermined runway threshold value and the runway variable;
determine a go-around advisory based on at least one of the flight path difference, the airspeed difference, and the runway difference;
provide an alert regarding the go-around advisory, wherein the alert comprises at least one of a visual alert, an aural alert, and a detailed information alert; and
determine a weighted sum based on the flight path difference, the airspeed difference, and the runway difference.

16. The controller of claim 15, wherein the weighted sum comprises weights associated with each of the flight path difference, the airspeed difference, and the runway difference, and wherein the controller is configured to determine the go-around advisory in response to the weighted sum exceeding a predetermined threshold value.

17. The controller of claim 16, wherein the weights associated with each of the flight path difference, the airspeed difference, and the runway difference are tuned to bias the controller to determine the go-around advisory based on one of the flight path difference, the airspeed difference, and the runway difference.

18. The controller of claim 11, wherein the detailed information alert comprises a cause of the go-around advisory.

19. A method for determining if a landing of an aircraft should be aborted, the method comprising:
receiving at least one of flight path information, airspeed information, and runway information from one or more avionic systems, wherein the runway information comprises an estimated touchdown location and a speed of the aircraft;
comparing one or more of the flight path information, the airspeed information, and the runway information to an associated reference value;
determining a required landing distance and an available landing distance based on the estimated touchdown location and the speed of the aircraft;
determining a go-around advisory based on the required landing distance exceeding the available landing distance; and
outputting an alert regarding the go-around advisory, wherein the alert comprises at least one of a visual alert, an auditory alert, and a detailed information alert.

20. The method of claim 19, further comprising activating an autonomous go around system in response to the go-around advisory being determined.

21. The method of claim 19, further comprising determining a weighted sum based on the flight path information, the airspeed information, and the runway information, and determining the go-around advisory in response to the weighted sum exceeding a predetermined threshold value.

* * * * *